United States Patent
Rozenstein et al.

(10) Patent No.: US 11,557,117 B2
(45) Date of Patent: Jan. 17, 2023

(54) METHOD AND SYSTEM FOR ESTIMATING CROP COEFFICIENT AND EVAPOTRANSPIRATION OF CROPS BASED ON REMOTE SENSING

(71) Applicant: The State of Israel, Ministry of Agriculture & Rural Development Agricultural Research Organization, Rishon Lezion (IL)

(72) Inventors: Offer Rozenstein, Tel Aviv (IL); Josef Tanny, Tel Aviv (IL)

(73) Assignee: THE STATE OF ISRAEL, MINISTRY OF AGRICULTURE & RURAL DEVELOPMENT AGRICULTURAL RESEARCH ORGANIZATION, Rishon Lezion (IL)

(*) Notice: Subject to any disclaimer, the term of this patent is extended or adjusted under 35 U.S.C. 154(b) by 29 days.

(21) Appl. No.: 16/964,265

(22) PCT Filed: Jan. 24, 2019

(86) PCT No.: PCT/IB2019/050605
§ 371 (c)(1),
(2) Date: Jul. 23, 2020

(87) PCT Pub. No.: WO2019/145895
PCT Pub. Date: Aug. 1, 2019

(65) Prior Publication Data
US 2021/0042523 A1   Feb. 11, 2021

Related U.S. Application Data

(60) Provisional application No. 62/621,067, filed on Jan. 24, 2018.

(51) Int. Cl.
*G06V 20/00*   (2022.01)
*G06V 20/10*   (2022.01)
(Continued)

(52) U.S. Cl.
CPC .......... *G06V 20/188* (2022.01); *G06Q 50/02* (2013.01); *G06T 7/0016* (2013.01);
(Continued)

(58) Field of Classification Search
CPC ............ G06K 9/00657; G06K 9/2018; G06K 2009/00644; G06Q 50/02; G06T 7/0016; G06T 2207/10036; G06T 2207/30188
(Continued)

(56) References Cited

U.S. PATENT DOCUMENTS 7,058,197 B1    6/2006  McGuire et al.
7,911,517 B1 *  3/2011  Hunt, Jr. .................. H04N 5/33
                                                    348/272
(Continued)

FOREIGN PATENT DOCUMENTS

CN    103793596 A    5/2014

OTHER PUBLICATIONS

Van der Silk Bart, "Using Vegetation Indices from Satellite Images to Estimate Evapotranspiration and Vegetation Water Use in North-Central Portugal". 2013, retrieved from "http://edepot.wur.nl/283768" van der Silk Bart Jan. 1, 2013 (Jan. 1, 2013) entire document.
(Continued)

*Primary Examiner* — Michael R Neff
(74) *Attorney, Agent, or Firm* — Mark M. Friedman

(57) ABSTRACT

Methods and systems estimate crop coefficients of a crop. At least one image sensor system captures a plurality of multispectral images of the crop and image data is derived from the multispectral images. At least one vegetation index of the crop is determined based on image data in at least a first spectral band. The reflectance of the crop monotonically increases and reaches a reflectance of at least 20% for at least one wavelength in the first spectral band. A crop
(Continued)

coefficient of the crop is estimated based on the determined at least one vegetation index.

19 Claims, 8 Drawing Sheets

(51) Int. Cl.
*G06Q 50/02* (2012.01)
*G06T 7/00* (2017.01)
*G06V 10/143* (2022.01)

(52) U.S. Cl.
CPC .. *G06V 10/143* (2022.01); *G06T 2207/10036* (2013.01); *G06T 2207/30188* (2013.01); *G06V 20/194* (2022.01)

(58) Field of Classification Search
USPC .......................................................... 382/110
See application file for complete search history.

(56) References Cited

U.S. PATENT DOCUMENTS

| | | | | |
|---|---|---|---|---|
| 10,769,436 | B2 * | 9/2020 | Nelson ................... | H04N 9/097 |
| 2010/0212409 | A1 * | 8/2010 | Ranjan ..................... | G01N 5/02 |
| | | | | 73/73 |
| 2010/0309313 | A1 * | 12/2010 | Antikidis ............. | B64G 1/1085 |
| | | | | 348/144 |
| 2011/0047867 | A1 * | 3/2011 | Holland ................. | G01N 21/55 |
| | | | | 356/51 |
| 2012/0290140 | A1 * | 11/2012 | Groeneveld ........... | A01G 22/00 |
| | | | | 700/284 |
| 2015/0071528 | A1 * | 3/2015 | Marchisio ............... | G06F 16/29 |
| | | | | 382/159 |
| 2016/0292626 | A1 * | 10/2016 | Green .................... | G06Q 50/02 |

OTHER PUBLICATIONS

Reyes González, Arturo, Jeppe Kjaersgaard, Todd Trooien, Christopher Hay, and Laurent Ahiablame. "Estimation of crop evapotranspiration using satellite remote sensing-based vegetation index." Advances in Meteorology 2018 (2018). Reyes González Arturo Feb. 1, 2018 (Feb. 1, 2018) entire document.

Farg, E., Arafat, S, M., El-Wahed, M. A., & El-Gindy, A. M. (2012). Estimation of evapotranspiration ETc and crop coefficient Kc of wheat, in south Nile Delta of Egypt using integrated FAO-56 approach and remote sensing data. The Egyptian Journal of Remote Sensing and Space Science, 15(1), 83-89. Eslam Farg Jun. 1, 2012 (Jun. 1, 2012) entire document.

Calera, Alfonso, Isidro Campos, Anna Osann, Guido D'Urso, and Massimo Menenti. "Remote sensing for crop water management: From ET modelling to services for the end users." Sensors 17, No. 5 (2017): 1104 Calera Alfonso May 11, 2017 (May 11, 2017) entire document.

Nagler PL, Scott RL, Westenburg C, Cleverly JR, Glenn EP, Huete AR. 2005. Evapotranspiration on western U.S. rivers estimated using the Enhanced Vegetation Index from MODIS and data from eddy covariance and Bowen ratio flux towers. Remote Sensing of Environment Pamela L. Nagler Aug. 15, 2005 (Aug. 15, 2005) entire document.

* cited by examiner

METHOD AND SYSTEM FOR ESTIMATING CROP COEFFICIENT AND EVAPOTRANSPIRATION OF CROPS BASED ON REMOTE SENSING

CROSS-REFERENCE TO RELATED APPLICATIONS

This application claims priority from U.S. Provisional Patent Application No. 62/621,067, filed Jan. 24, 2018, whose disclosure is incorporated by reference in its entirety herein.

TECHNICAL FIELD

The present invention relates to crop characteristic estimation methods and systems.

BACKGROUND OF THE INVENTION

Monitoring the changes of soil and crops status in agricultural fields throughout the growing season is key in increasing production efficiency. As the crop develops from seedling to a fully mature plant, the evapotranspiration of the crop changes accordingly, as do the crop water requirements. In the early stages of the growing season, the majority of the evapotranspiration is attributed to evaporation from the soil surface. Yet, as the crop develops, the relative contribution of transpiration to the evapotranspiration increases as the vegetation cover increases, and eventually declines with maturity and senescence. Therefore, information about the crop evapotranspiration ($ET_c$), which represents the combined water loss due to evaporation from the soil surface and transpiration from the crop, can facilitate better irrigation planning, and ultimately, water use efficiency.

The crop coefficient ($K_c$) approach for estimating $ET_c$ relies on the estimation of reference evapotranspiration ($ET_0$) from a hypothetical crop such that $ET_c = K_c \times ET_0$. While $ET_0$ is either calculated based on standard meteorological measurements using the Penman-Monteith Method, or based on pan evaporation measurements, $K_c$ is derived experimentally per crop and soil type and thus separates the climatic demand from the plant response.

The United Nations' Food and Agricultural Organization (FAO) has provided details on the development and use of $K_c$ values for different crops in different parts of the world. However, $K_c$ has been shown to vary between sites and between seasons. Additionally, in cases of atypical crop development and water-use patterns caused by weather anomalies, adopting the FAO-recommended $K_c$ values often results with imprecise $ET_c$ estimations. As a result, local adaptations to the FAO-recommended $K_c$ values are implemented to form local $K_c$ tables, but even these sometimes fail to capture deviations from standard conditions due to specific fertilization, variations in crop planting density, and stress factors such as pests. In addition, the spatial variation in $ET_c$ due to spatial heterogeneity in soil characteristics such as water holding capacity and availability of nutrients is not reflected in standard $K_c$ tables.

SUMMARY OF THE INVENTION

The present invention is directed to methods and systems for estimating crop coefficient and evapotranspiration of crops.

According to the teachings of an embodiment of the present invention, there is provided a method that comprises: determining at least one vegetation index of a crop based on image data in at least a first spectral band in which reflectance of the crop is monotonically increasing and reaches a reflectance of at least 20% for at least one wavelength in the first spectral band, the image data being derived from a plurality of spectral images of the crop captured by at least one image sensor system; and estimating an estimated crop coefficient of the crop based on the determined at least one vegetation index.

Optionally, the method further comprises estimating an estimated evapotranspiration of the crop based on the estimated crop coefficient of the crop.

Optionally, each spectral image of the plurality of spectral images is captured at a respective temporal instance, and the at least one vegetation index is determined for each of the plurality of spectral images so as to form a plurality of determinations of the at least one vegetation index.

Optionally, the estimating the estimated crop coefficient includes applying a mapping function, generated based in part on a first subset of the plurality of determinations of the at, least one vegetation index, to at least one determination of the at least one vegetation index in a second subset of the plurality of determinations of the at least one vegetation index.

Optionally, the mapping function is generated by: measuring evapotranspiration of the crop at a plurality of temporal instances, each temporal instance of measured evapotranspiration being associated with a respective one of the temporal instances at which a first subset of the plurality of spectral images were captured, the first subset of the plurality of spectral images corresponding to the first subset of the plurality of determinations of the at least one vegetation index, determining a true crop coefficient of the crop, for each temporal instance of the plurality of temporal instances, based on the measured evapotranspiration, and fitting a curve to a plurality of data pairs, each data pair includes a respective one of the determined true crop coefficients and a respective one of the determined at least one vegetation indices.

Optionally, the measuring evapotranspiration of the crop is performed, in part, by an eddy covariance system.

Optionally, the at least one image sensor system is a non-terrestrial image sensor system.

Optionally, the at least one image sensor system is deployed on a satellite in heliosynchronous orbit around the Earth.

Optionally, the at least one image sensor system is deployed on an unmanned aerial vehicle.

Optionally, the crops grow in a crop growing region, and the at least one image sensor system has a revisit time, for capturing the spectral images of the crop growing region, of less than 10 days.

Optionally, the at least one image sensor system includes a plurality of image sensor systems.

Optionally, each image sensor system is deployed on a respective satellite, the satellites forming a satellite constellation in heliosynchronous orbit around the Earth.

Optionally, the satellite constellation has a revisit time of less than 10 days.

Optionally, each image sensor system is deployed on a respective unmanned aerial vehicle.

Optionally, the spatial resolution of the at least one image sensor system in the at least one spectral band is approximately 20 meters.

Optionally, the at least one vegetation index is determined for each spectral image of the plurality of spectral images, and, for each spectral image, the at least one vegetation index is determined by: evaluating the at least one vegetation index for each pixel in a selected subset of pixels of the spectral image, and combining the at least one vegetation index for each of the pixels in the selected subset of pixels to form a combined vegetation index for the spectral image.

Optionally, the at least one vegetation index includes a plurality of vegetation indices.

Optionally, the spectral images include image data in a plurality of spectral bands outside of the first spectral band, and the at least one vegetation index is further determined based on the image data in at least one of the plurality of spectral bands outside of the first spectral band.

Optionally, the first spectral band includes wavelengths between approximately 680 nanometers and approximately 780 nanometers.

Optionally, the first spectral band includes a plurality of spectral sub-bands.

Optionally, the plurality of spectral sub-bands includes at least a first, a second, and a third spectral sub-band, and the first spectral sub-band includes wavelengths between approximately 680 nanometers and approximately 715 nanometers, and the second spectral sub-band includes wavelengths between approximately 720 nanometers and approximately 750 nanometers, and the third spectral sub-hand includes wavelengths between approximately 755 nanometers and approximately 780 nanometers.

Optionally, the method further comprises capturing, by the at least one image sensor system, the plurality of spectral images.

There is also provided according to an embodiment of the teachings of the present invention a method that comprises: determining a plurality of values of a vegetation index of a crop based on image data, in at least a first spectral band, derived from a plurality of spectral images of the crop captured by at least one image sensor system; determining a plurality of crop coefficient values based on a plurality of measurements of evapotranspiration of the crop; and estimating an estimated crop coefficient of the crop based on the determined plurality of values of the vegetation index and the plurality of crop coefficient values.

There is also provided according to an embodiment of the teachings of the present invention a method that comprises: obtaining image data from a plurality of spectral images of a crop growing area, the image data including spectral data in at least a first spectral band in which reflectance of a crop, growing in the crop growing area, is monotonically increasing and reaches a reflectance of at least 20% for at least one wavelength in the first spectral band; determining at least one vegetation index of the crop based on the spectral data in the first spectral band; and estimating an estimated crop coefficient of the crop based on the determined at least one vegetation index.

There is also provided according to an embodiment of the teachings of the present invention a method for estimating a crop coefficient of a crop. The method comprises: obtaining a plurality of data pairs, each data pair includes: a value of a vegetation index of the crop, the vegetation index value based on image data, in at least a first spectral band derived from a spectral image of the crop captured by at least one image sensor system, and a true crop coefficient of the crop, the true coefficient being determined based on measured evapotranspiration of the crop; and generating a mapping function from the vegetation index to the crop coefficient by fitting a curve to the plurality of data pairs.

There is also provided according to an embodiment of the teachings of the present invention a method that comprises: determining at least one vegetation index of a crop based on spectral data in a spectral band having wavelengths between approximately 680 nanometers and approximately 780 nanometers, the spectral data being obtained from a plurality of spectral images of the crop captured by at least one image sensor system; and estimating an estimated crop coefficient of the crop based on the determined at least one vegetation index.

There is also provided according to an embodiment of the teachings of the present invention a system that comprises: a processing subsystem configured to: determine at least one vegetation index of a crop based on image data in at least a first spectral band in which reflectance of the crop is monotonically increasing and reaches a reflectance of at least 20% for at least one wavelength in the first spectral band, the image data being derived from a plurality of spectral images of the crop captured by at least one image sensor system, and estimate an estimated crop coefficient of the crop based on the determined at least one vegetation index.

Optionally, the at least one image sensor system captures each spectral image of the plurality of spectral images at a respective temporal instance, and the processing subsystem is configured to determine the at least one vegetation index for each of the plurality of spectral images so as to form a plurality of determinations of the at least one vegetation index.

Optionally, the processing subsystem is configured to estimate the estimated crop coefficient by applying a mapping function, generated based in part on a first subset of the plurality of determinations of the at least one vegetation index, to at least one determination of the at least one vegetation index in a second subset of the plurality of determinations of the at least one vegetation index.

Optionally, the system further comprises an evapotranspiration measuring subsystem to measure evapotranspiration of the crop at a plurality of temporal instances, each temporal instance of measured evapotranspiration being associated with a respective one of the temporal instances at which a first subset of the plurality of spectral images were captured, the first subset of the plurality of spectral images corresponding to the first subset of the plurality of determinations of the at least one vegetation index, and the processing subsystem is further configured to generate the mapping function by: determining a true crop coefficient of the crop, for each temporal instance of the plurality of temporal instances, based on the measured evapotranspiration, and fitting a curve to a plurality of data pairs, each data pair includes a respective one of the determined true crop coefficients and a respective one of the determined at least one vegetation indices.

Optionally, the system further comprises the at least one image sensor system.

There is also provided according to an embodiment of the teachings of the present invention a method that comprises: obtaining a plurality of spectral images of a crop growing area, the spectral images including image data in at least a first spectral band in which reflectance of a crop, growing in the crop growing area, is monotonically increasing and reaches a reflectance of at least 20% for at least one wavelength in the first spectral band; determining at least one vegetation index of the crop based on the image data in the first spectral band; and estimating an estimated crop coefficient of the crop based on the determined at east one vegetation index.

There is also provided according to an embodiment of the teachings of the present invention a method that comprises: determining a plurality of vegetation indices of a crop based on image data derived from a plurality of spectral images of the crop captured by at least one image sensor system; estimating, for each vegetation index of the determined plurality of vegetation indices, an estimated crop coefficient of the crop based on the vegetation index, so as to generate a plurality of estimated crop coefficients; calculating, for each of the estimated crop coefficients, at least one fidelity measurement; and selecting a selected estimated crop coefficient from the plurality of estimated crop coefficients based on the at least one fidelity measurement associated with each of the estimated crop coefficients, the selected estimated crop coefficient corresponds to at least one vegetation index of the plurality vegetation indices that is determined based on spectral data, of the image data, in at least a first spectral band in which reflectance of the crop is monotonically increasing and reaches a reflectance of at least 20% for at least one wavelength in the first spectral band.

There is also provided according to an embodiment of the teachings of the present invention a non-transitory computer-readable storage medium having embedded thereon computer-readable code comprising program code for: determining at least one vegetation index of a crop based on image data in at least a first spectral band in which reflectance of the crop is monotonically increasing and reaches a reflectance of at least 20% for at least one wavelength in the first spectral hand, the image data being derived from a plurality of spectral images of the crop captured by at least one image sensor system; and estimating an estimated crop coefficient of the crop based on the determined at least one vegetation index.

There is also provided according to an embodiment of the teachings of the present invention a computer program that can be loaded onto a processing unit connected through a network, so that the processing unit running the computer program constitutes a processing subsystem according to any of the embodiments described in the present disclosure.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 2:
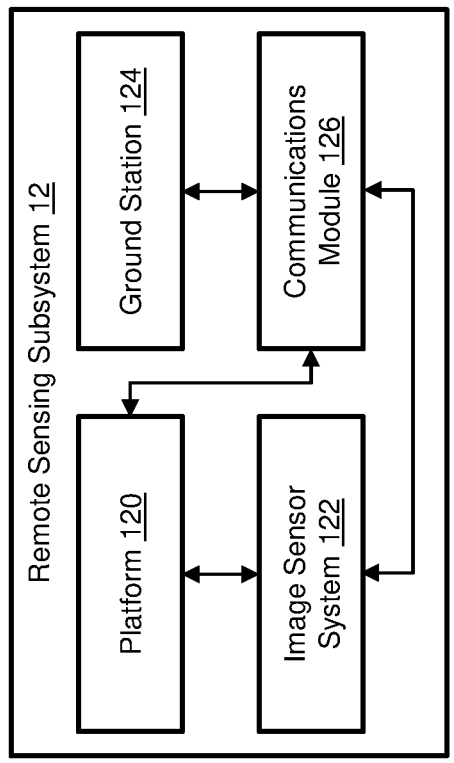
FIG. 2 is a block diagram of the remote sensing subsystem, according to an embodiment of the present disclosure.

The present invention is directed to methods and systems for estimating crop coefficient and evapotranspiration of crops.

The principles and operation of the methods and systems according to the present disclosure may be better understood with reference to the drawings and the accompanying description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

By way of introduction, vegetation has a unique spectral signature that enables the vegetation to be distinguished from other types of land cover in spectral images. The reflectance of vegetation is low in the blue and red regions of the electromagnetic spectrum, due to the absorption by chlorophyll for photosynthesis. The reflectance is higher in the near infrared (NIR) region, due to the cellular structure of the leaves of the vegetation. The reflectance rapidly increases, monotonically, from lower reflectance to higher reflectance between the red and NW regions of the electromagnetic spectrum. The region of rapid increase is referred to as the "red edge" region. Generally speaking, the red edge (RE) region begins at wavelengths of approximately 680 nanometers (nm) (towards the end of the red region of the electromagnetic spectrum) and ends at wavelengths of approximately 780 nm (towards the beginning of the NIR region). The boundaries (i.e., edges) of the red edge region vary moderately for different vegetation species according to their phenological growth stage, and at different scales for the same species (i.e., there are variations in reflectance between the canopy level and the individual leaf level).

Figure 11:
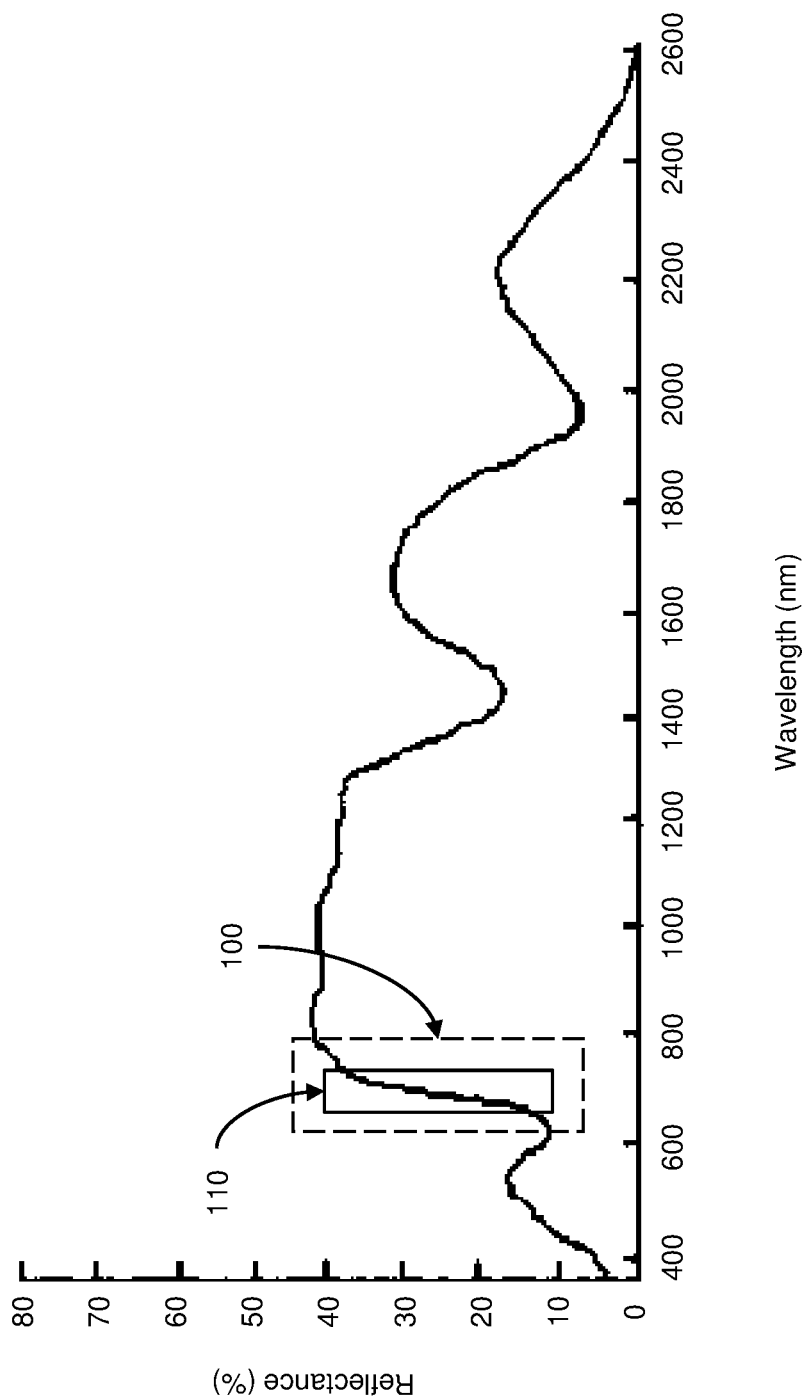
FIG. 11 is a reflectance spectrum of a generic species of vegetation over a range of spectral bands, including the visible region, the near-infrared region (NIR), and the shortwave infrared (SWIR) region of the electromagnetic spectrum.

FIG. 11 shows a plot of the spectral signature of a generic vegetation species, with the red edge region being demarcated by the dashed rectangle 100. As can be seen in FIG. 11, the reflectance increases monotonically and sharply in the red edge region. In general, the reflectance in the rede edge region reaches levels of at least 20%, and in certain instances (depending on vegetation species) may reach reflectance levels of up to 80%. The rapid (i.e., sharp) change in reflectance can be characterized, in certain instances, by a change from approximately 5% reflectance to approximately 50% reflectance over the span of approximately 50 nm in wavelength, and in other instances, by a change from approximately 5% reflectance to approximately 80% reflectance over the span of approximately 100 nm in wavelength (e.g., ~680 nm to ~780 nm). In general, the maximum difference in reflectance (i.e., the difference between the minimum reflectance and the maximum reflectance) in the red edge region is at least 30%, but in certain instances can reach 80%. This extremely rapid change sub-region of the red edge region is demarcated by the solid rectangle 110.

It is a particularly preferred feature of embodiments of the present disclosure that the presented methods harness reflectance characteristics of vegetation in the red edge region of the electromagnetic spectrum, and in certain instances use the reflectance characteristics of vegetation in the red edge region in combination with other spectral regions such as the visible and NIR regions. The methods of the embodiments of the present disclosure harness the reflectance characteristics of vegetation in the red edge region by utilizing spectral data in spectral images, captured by the image sensor system, in order to estimate and subsequently estimate evapotranspiration, for particular species of crops. As will be discussed, vegetation indices (VIs) that rely heavily on reflectance values in the red edge region are preferably used to estimate the crop coefficient for crop species. The realization of the correlation between crop coefficient and VIs based on reflectance in the red edge region is not straightforward, and relies on recognition of the VIs utilizing such spectral data in combination with the unique spectral properties of vegetation species in the red edge region.

Embodiments of the present disclosure are applicable to various crop growing situations, and are of particular value when applied to outdoor crop growing in which species of vegetation, including, for example, cotton, processing tomatoes, wheat, and corn, are grown in agricultural fields in large quantities with large scale irrigation systems supplying water to the base and/or roots of the individual plant crops. The potential applications of the embodiments of the present disclosure should not be limited to the applications used for the purposes of illustrating the principles and operation of the methods and systems disclosed herein.

Figure 1:
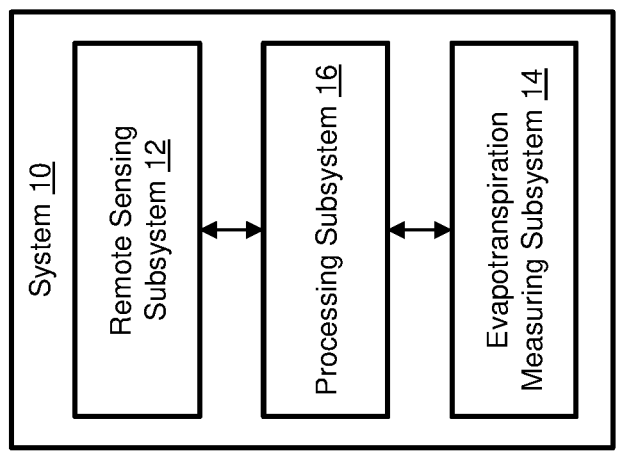
FIG. 1 is a block diagram of a system, for estimating crop coefficient and evapotranspiration of crops, according to an embodiment of the present disclosure, that includes a remote sensing subsystem, an evapotranspiration measuring subsystem, and a processing subsystem.

Referring now to the drawings, FIG. 1 illustrates a block diagram of a system, generally designated 10, operative according to embodiments of the present disclosure, for estimating the crop coefficient ($K_c$) and evapotranspiration ($ET_c$) of crops growing in a crop growing area. Generally speaking, the system 10 has a remote sensing subsystem (RSS) 12, an evapotranspiration measuring subsystem (EMS) 14, and a processing subsystem 16.

With continued reference to FIG. 1, refer now to FIG. 2, a block diagram of the RSS 12. The RSS 12 generally includes a platform 120, which is preferably an airborne or space-based platform, an image sensor system 122 (i.e., camera system), a communications module 124, and a ground station 126. The platform 120 is configured to periodically move across or near the crop growing area by, for example, flying or orbiting over or near the crop growing area, so as to position the crop growing area within the field of view of the image sensor system 122. The crop growing area is, for example, an agricultural field, in which the crop is grown. The image sensor system 122 and the communications module 124 are mounted to the platform 120. The image sensor system 122 is configured to capture spectral images of the crop when the crop growing area is within the field of view of the image sensor system 122.

The spectral images captured by the image sensor system 122 include spectral image data, preferably in the visible, near infrared (NIR), and short-wave infrared (SWIR) regions of the electromagnetic spectrum. The image sensor system 122 may be implemented as a multispectral image sensor that captures multispectral images, a hyperspectral image sensor that captures hyperspectral images, a superspectral image sensor that captures superspectral images, or any other type of spectral image sensing system configured to capture spectral images at multiple spectral bands of the electromagnetic spectrum.

The image sensor system 122 is a high spectral resolution sensor, in that it captures spectral information at a high level of granularity in wavelengths in the operational spectral bands visible, NIR, SWIR, etc.). In fact, the image sensor system 122 preferably operates at high enough spectral resolution to capture spectral data in the spectral images that is indicative of crop reflectance at specific wavelengths of interest, as will be discussed in subsequent sections of the present disclosure.

The communications module 124 is configured to receive uplink communication signals (via an uplink antenna arrangement mounted to the platform 120) from the ground station 126, and to transmit downlink communication signals (via a downlink antenna arrangement mounted to the platform 120) to the ground station 126. The uplink communications signals transmitted by the ground station 126 may include command and control signals for performing command and control operations of the non-terrestrial components of the RSS 12 (e.g., the image sensor system 122 and the communications module 124). The downlink communications signals include information bearing signals having the spectral image data embedded/encoded therein, which allows the ground station 126 to receive the spectral images captured by the image sensor system 122. Although not shown in the drawings, the ground station 126 includes a communications module for transmitting uplink communication signals and receiving downlink communication signals. In addition, the ground station 126 may also include data storage components (e.g., memory) for storing the received spectral images (i.e., image data) captured by the image sensor system 122.

In certain embodiments, the image data is stored as a data record in the memory of the ground station 126, or stored as a data record in a memory of the processing subsystem 16. The data record includes, for each pixel of each spectral image, the corresponding pixel information. Since spectral images contain information for multiple spectral hands, the pixel information is represented as a vector of values for each pixel, with each vector component corresponding to a different spectral band (e.g., red, green, blue, low red edge (e.g., ~695 nm-~715 nm), mid red edge (e.g., ~730 nm-~750 nm), etc.).

According to certain embodiments, the platform 120 is implemented as a satellite in heliosynchronous orbit around the Earth. In such embodiments, it is preferred that a constellation of at least two such satellites is used, with each such satellite having a payload that includes an image sensor system 122. The Sentinel-2 satellite constellation, which includes (for the time being) two satellites (a first satellite Sentinel-2A, and a second satellite Sentinel-2B), manufactured by a consortium led by Airbus DS, and operated by the European Space Agency, is an exemplary space-based platform and image sensor system combination that may be used to implement the methods according to embodiments of the present disclosure. In the non-limiting Sentinel-2 implementation, the image sensor system 122 is implemented as a spectral instrument that acquires optical imagery in the visible, near infrared (NIR), and short-wave infrared (SWIR) regions of the electromagnetic spectrum at a spatial resolution between 10 and 60 meters (m), depending on the spectral band. In particular, the spatial resolution in visible light region is 10 m, the spatial resolution in the red edge region is 20 m, the spatial resolution in the NIR region is 10 m, m, the spatial resolution in the narrow NIR region is 20 m, and the spatial resolution in the SWIR region can take on values of 20 m at the low end of the SWIR region and 60 m at the high end of the SWIR region.

Figure 3:
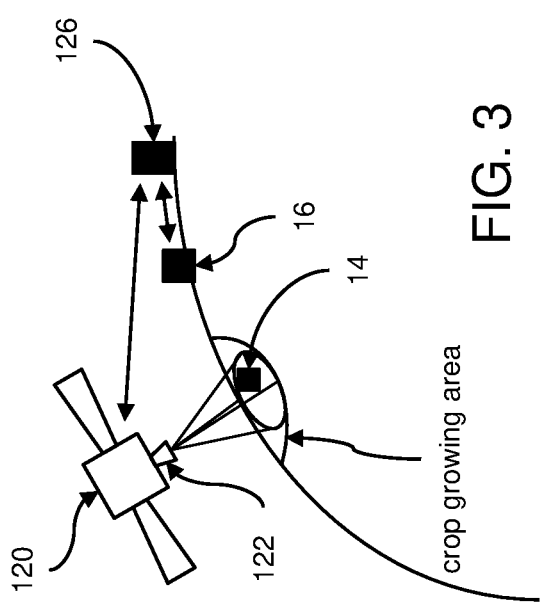
FIG. 3 is a schematic representation of an environment in which components of the system may be deployed, according to an embodiment of the present disclosure.

FIG. 3 illustrates a schematic representation of an environment in which components of the system 10 may be deployed. In the schematic representation of the RSS 12 in FIG. 3, the platform 120 is implemented as a satellite.

In other embodiments, the platform 120 is implemented as an unmanned aerial vehicle (UAV), for example the Matrice 600 Pro available from DJI of Shenzhen, China, onto which the image sensor system 122 is mounted. In such non-limiting implementations, the image sensor 122 is preferably implemented as one or more optical image sensors configured to acquire optical imagery in at least the visible and NIR regions of the electromagnetic spectrum. An example of such an optical image sensor is the Red Edge MX available from MicaSense of Seattle, Wash., In embodiments in which the platform 120 is implemented as a UAV, a fleet of UAVs (i.e., a constellation of UAVs) may be deployed, with each UAV having an image sensor system 122 mounted thereto.

Implementing the platform 120 as a UAV has certain advantages over the satellite implementation. One such advantage is the potential increase in the spatial resolution of the images captured by the image sensor system 122. Since UAVs are deployed at significantly lower altitudes than satellites, for example in a range between 25 meters (m) and 200 (m) above the crop, the image sensor system 122, when mounted to a UAV, can provide spatial resolution on the order of several centimeters (cm), and in certain cases, spatial resolution of approximately 2 cm.

Another advantage of implementing the platform 120 as a UAV is the potential increase in the temporal resolution (i.e., revisit time) of the RSS 12. Satellite based remote sensing systems have revisit times on the order of several days, due to the relatively long orbit period of the satellites in the constellation. For example, each of the satellites of the Sentinel-2 satellite constellation has a revisit time of 10 days, with the two satellites being out of phase with each other by 5 days, making the overall revisit time of the Sentinel-2 satellite constellation 5 days. UAVs, on the other hand, can be deployed in larger numbers and more easily controlled by a centralized control station (e.g., the ground station 126). For example, as mentioned above, a fleet of UAV/image sensor system units can be deployed, which provides wider coverage of crop growing areas. The deployment of larger numbers of UAVs lends to higher temporal resolution when compared to satellite-based remote sensing systems.

Note that since the spatial resolution of the image sensor system 122 is wavelength dependent (i.e., certain spectral bands have higher spatial resolution than other spectral bands), the number of pixels in certain components of the pixel vector may be higher than the number of pixels in other components of the pixel vector. For example, the number of pixels in the pixel vector components corresponding to the visible light region may be greater than the number of pixels in the pixel vector components in the red edge region.

In certain embodiments, the image sensor system 122 is configured to reduce the spatial resolution of certain spectral bands such that all spectral bands in the same spectral image have the same spatial resolution. In such embodiments, the resultant number of pixels in all pixel vector components is the same. For example, if the image sensor system 122 captures a spectral image covering the red (i.e., ~650 nm-~690 nm) and low red edge (i.e., ~695 nm-~715 nm) spectral bands, the spatial resolution of the red region may be reduced from 10 m to 20 m to match the spatial resolution of the low red edge region. As such, if the 10 m resolution initially corresponds to N pixels and the low red edge region corresponds to M pixels (with N>M), the spatial resolution of the red region is reduced such that the number of pixels for the red region is M pixels.

Parenthetically, the relatively high spatial resolution at which the image sensor system 122 operates enables estimation of $K_c$ at higher granularity of the crop. In other words, by employing a high spatial resolution image sensor system, can be estimated at the individual plant level (i.e., per each individual plant) as opposed to the canopy level. Furthermore, increased temporal resolution provides a larger number of data points which are used to generate the $K_c$ estimation function. In addition, the overall increase of estimation accuracy enabled by calculation of VIs that rely heavily on reflectance values in the red edge region, and the increase in temporal resolution at which $K_c$ can be estimated, enables increased crop resource estimation (e.g., water usage for irrigation, fertilizer, pesticide spray, etc.). In particular, by employing the $K_c$ estimation methods of the present disclosure, the amount of water used in crop irrigation over a single growing season can be reduced by 10%-15% without a significant change in yield.

As will be discussed in detail in subsequent sections of the present disclosure, the methods according to the present embodiments analyze (i.e., process) the spectral data from the spectral images, together with measured evapotranspiration of the crop, as measured by the EMS 14, in order to estimate $K_c$ and subsequently estimate $ET_c$. The EMS 14 includes several data gathering components that are deployed in or around the crop growing area in order to gather data related to the crops which can be processed to produce ground truth evapotranspiration of the crop. The EMS 14 gathers data at multiple temporal instances (i.e., periodically over the course of several days/weeks/months) in order to produce multiple temporal instances of ground truth evapotranspiration ($ET_c$).

Figure 4:
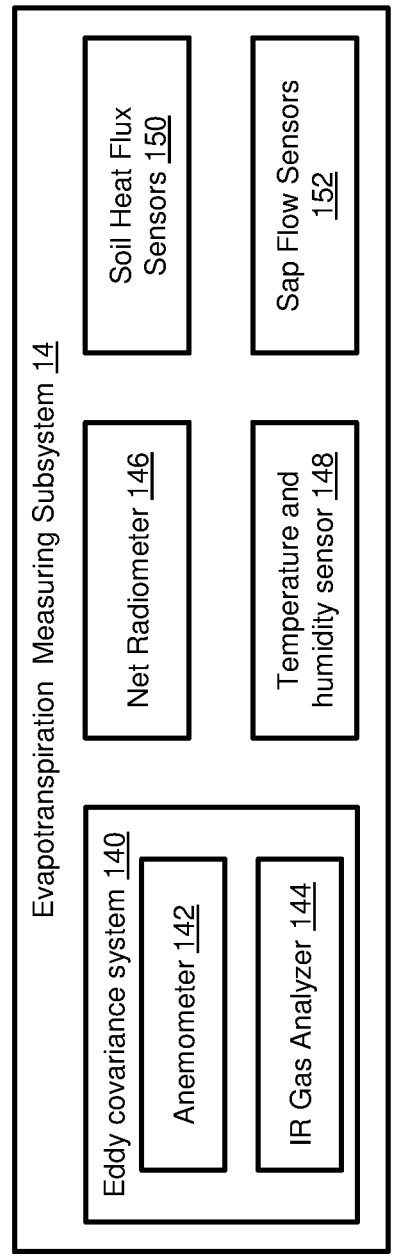
FIG. 4 is a block diagram of the evapotranspiration measuring subsystem, according to an embodiment of the present disclosure.

Refer now to FIG. 4, a block diagram of the EMS 14. The EMS 14 has an eddy covariance system 140 for measuring latent heat flux (LE) and sensible heat flux (H). The eddy covariance system 140 includes a three-axis ultrasonic anemometer 142 (implemented, for example, as the CSAT3 available from Campbell Scientific of Logan, Utah) for measuring wind speed vector and sonic temperature, and an infrared gas analyzer 144 (implemented, for example, as the LI-7500 available form LI-COR of Lincoln, Neb.) for measuring water vapor concentration.

The eddy covariance system 140 is deployed in the crop growing area, preferably mounted to a pole or tower-like structure in a centralized section of the crop growing area, at a height suitable for capturing measurements for calculating latent heat flux, which is used to calculate ground truth evapotranspiration (ETA According to certain non-limiting deployments, the eddy covariance system 140 is deployed at a height of approximately 4 m above the ground, and more particularly at a height of 3.65 m above the ground.

Figure 5C:
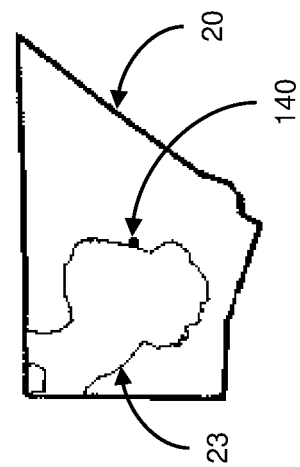
FIG. 5C is a schematic illustration of an example area that corresponds to a selected subset of pixels in a spectral image captured by an image sensing system of the remote sensing subsystem, according to an embodiment of the present disclosure.
Figure 5B:
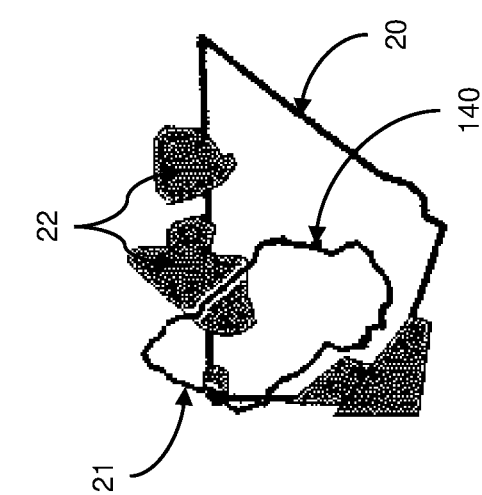
FIG. 5B is a schematic illustration of an example area from which a majority portion of the data measured by the evapotranspiration measuring subsystem, according to embodiments of the present disclosure, originate.
Figure 5A:
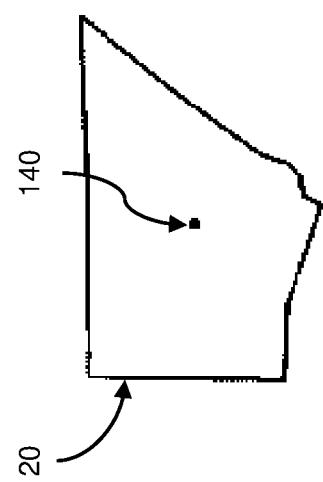
FIG. 5A is a schematic illustration of an example crop growing area in which components of the system according to embodiments of the present disclosure can be deployed.

FIG. 5A shows a schematic illustration of a deployment of the eddy covariance system 140 in the crop growing area. The crop growing area is represented by a polygon 20, wherein the EMS 14 measures evapotranspiration of the crop plants grown inside the polygon 20. As will be discussed in subsequent sections of the present disclosure, the size and location of the polygon 20 is determined based on analysis of the spectral images together with flux footprint modeling, captured by the image sensor system 122, by the processing subsystem 16.

The anemometer 142 and the infrared gas analyzer 144 output raw signals are sampled (for example at a 20 Hz sampling rate) and captured by a data capture system (implemented, for example, as the CR3000 data logger available from Campbell Scientific). The sampled and captured signals are then processed by a processing system (not shown) that executes application specific software (implemented, for example, as the EddyPro software available from LI-COR). The processing system outputs flux data based on the captured sampled signals.

In addition to the eddy covariance system 140, the EMS 14 includes components for facilitating energy-balance closure analysis in order to verify the flux measurements performed by the eddy covariance system 140, and in order to perform surface energy balance methods for calculating ground truth evapotranspiration ($ET_c$). Such components include a net radiometer 146, a temperature and humidity sensor 148 and soil heat flux sensors 150.

The net radiometer 146 (implemented, for example, as the Q7.1 available from REBS of Seattle, Wash.) measures net radiation ($R_n$), i.e., the balance of incoming and outgoing radiation energy flux. In a non-limiting deployment, the net radiometer 146 is deployed at the same height and on the same pole as the eddy covariance system 140.

The temperature and humidity sensor 148 (implemented, for example, as the HMP45 of Campbell Scientific) is deployed to measure air temperature and relative humidity. In a non-limiting deployment, the temperature and humidity sensor 148 is deployed, on the same pole as the eddy covariance system 140, within a ventilated radiation shield at a height slightly less than the deployed height of the eddy covariance system 140.

The soil heat flux sensors 150 may be implemented as multiple soil heat flux plates (implemented, for example, as HFT-3.1 plates available from REBS) and Type T thermocouples. In a non-limiting deployment, four such soil heat flux plates are installed approximately 1 cm beneath the soil, with two Type T thermocouples installed in the soil above each plate at soil depths of approximately 20 millimeters (mm) and 60 mm, respectively. The soil heat flux sensors 150 perform measurements, which are indicative of soil heat flux (G). The soil heat flux (G) is calculated using procedures known to those of ordinary skill in the art. One such procedure is described by Rosa, et al., in "Estimating evapotranspiration from processing tomato using the surface renewal technique", published in *Biosystems Engineering*, 114, 406-413 (2013).

The EMS 14 performs additional processes, and includes additional components, in order to estimate heat fluxes in the event of failure of the eddy covariance system 140. Such additional processes include estimation of the sensible heat flux (H) based on the surface renewal method. In such methods, the sensible heat flux (H) is estimated from a high frequency single point temperature measurement. In certain non-limiting implementations, the single point temperature measurement is measured by a miniature Type T thermocouple (not shown), which may be deployed on the same pole as the eddy covariance system, at a height of approximately 1.5 m above the ground. The Type T thermocouple measures air temperature, and outputs raw signals, which are sampled (for example at a 10 Hz sampling rate) and captured by a data capture system the CR3000 data logger). The captured data is then analyzed to determine the sensible heat flux (H) by using surface renewal data analysis methods. Such methods are known to those of ordinary skill in the art, and one such method is described by Spano, et al., in "Surface renewal analysis for sensible heat flux density using structure functions", published in *Agricultural and Forest Meteorology*, 86, 259-271 (1997).

The additional components used to estimate heat fluxes in the event of failure of the eddy covariance system 140 include sensors 152 for measuring sap flow according to the heat-pulse technique. In a non-limiting deployment, the sensors 152 are installed on a selected number of individual plants of the crop. The heat-pulse technique is a common technique, known to those of ordinary skill in the art, for producing transpiration data, which for high-density crop fields is equivalent to evapotranspiration since soil evaporation is negligible.

As discussed above, the EMS 14 gathers data (via measurements) and processes the data to produce ground truth evapotranspiration of the crop at multiple temporal instances. The ground truth evapotranspiration is then used to determine the ground truth crop coefficient ($K_c$) at those temporal instances. The ground truth crop coefficient at those temporal instances results in a time series of crop coefficient values, and is used as input to the processing subsystem 16 in order to generate a mapping function between VI time series and the ground truth crop coefficient time series.

The ground truth crop coefficient ($K_c$) is determined by dividing the ground truth evapotranspiration ($ET_c$), calculated by the EMS 14, by the reference evapotranspiration ($ET_0$) from a hypothetical crop (since $K_c = ET_c/ET_0$). The ground truth crop coefficient ($K_c$) is used in combination with vegetation indices (VIs) in order to estimate $K_c$ and $ET_c$, based on the generated mapping function. Each vegetation index (VI) is determined by the processing subsystem 16, based on the spectral data from the spectral images. The following paragraphs describe an exemplary series of processes performed by the processing subsystem 16 in order to calculate various VIs.

Initially, the processing subsystem 16 receives the spectral images, captured by the image sensor system 122, from the RSS 12. In certain embodiments, the processing subsystem 16 may receive the spectral images from the ground station 126 via a data communication link. In other embodiments, the processing subsystem 16 may be embedded as part of the ground station 126, and may therefore receive the spectral images from the image sensor system 122 over the satellite communication downlink channel via the communications module 124.

The processing subsystem 16 generates a time series of VI values from the spectral images. In particular, each spectral image captured by the image sensor system 122 corresponds to a particular temporal instance (i.e., data point of the VI time series) in accordance to the revisit time of the platform 120. For example, using the example implementation of the Sentinel-2 satellite constellation, a series of five images may be captured by the image sensor system 122 over the course of twenty days, with an image captured every five days. Preferably, the temporal instances of the images captured by the image sensor system 122 coincide with the temporal instances at which the ground truth evapotranspiration ($ET_c$) is determined by the EMS 14. In order to generate the time series, the spectral images are preferably time-tagged by the RSS 12.

The processing subsystem 16 may pre-process the spectral images to select a selected subset of spectral images by removing/discarding images in which a significant or majority portion of the crop growing area is covered by atmospheric interference (e.g., cloud cover). The processing subsystem 16 may also perform atmospheric correction processes on the spectral images in order to remove scattering and absorption effects from the atmosphere. An example method for atmospheric correction is the dark object subtraction technique, which assumes negligible or near-negligible surface reflectance. In this method, for each image, a histogram of the pixel values is generated, and the minimum pixel value in the histogram is subtracted from each pixel value of the image. This process can be extended to spectral images, where a histogram can be generated for each pixel vector component, and the minimum pixel value in the histogram for that vector component is subtracted from each pixel value for that vector component.

The processing subsystem 16 subsequently filters each of the selected spectral images to select a selected subset of pixels (for each spectral image) to be used for generating multiple VI values. The subset of pixels is selected by first demarking the polygon 20 (FIG. 5A) that defines the borders of the crop growing area. A second polygon 21 (FIG. 5B) is generated based on a measurement density threshold that corresponds to the area from which the majority of the flux, measured by the eddy covariance system 140, originates (referred to as a "flux footprint"). FIG. 5B also shows sub-regions 22 in which the polygon 20 is masked by clouds. The intersection between the two polygons 20 and 21, after removal of the sub-regions 22, produces a third polygon 23, corresponding to the selected subset of pixels of the spectral image that are used to generate the VI values. The third polygon 23 is shown in FIG. 5C.

As discussed above, the pixels of the spectral images contain spectral data, in particular spectral reflectance measurement data, at wavelengths in multiple spectral bands in wavelengths between approximately 400 nm and approximately 2600 nm (for example, as shown in FIG. 11). Note that since the number of pixels in the pixel vector may vary across the different spectral bands (i.e., vary in spatial resolution), the processing subsystem 16 may be configured to sample the pixel values of the pixel vector components that contain larger numbers of pixels such that the effective number of pixels in each pixel vector component is equal. As mentioned above, in other embodiments the spatial resolution of certain spectral bands is reduced such that all spectral bands in the same spectral image have the same spatial resolution.

For each spectral image, the processing subsystem 16 extracts the spectral data, for each pixel in the selected subset of pixels, at spectral bands of interest, depending on the VI to be calculated. The processing subsystem 16 then calculates VI values, per pixel, based on the spectral bands of interest. For example, if the selected subset of pixels for a particular spectral image includes L pixels, the processing subsystem 16 calculates L VI values (i.e., a VI value for each of the L pixels), for each particular VI type.

Table 1 below shows, for each of various VI types, the spectral bands of interest and the formula for calculating VI. Table 1 also shows the corresponding band assignments for the Sentinel-2 satellite constellation, which can be used to implement the RSS 12 according to certain embodiments of the present disclosure. It is noted that the sources of the formulae for calculating each individual index are public domain, and are easily obtainable by those of ordinary skill in the art. As such, the specific wavelengths of interest, for each index, are easily obtainable or a priori knowledge possessed by one of ordinary skill in the art. Nevertheless, in certain instances of the entries in Table 1, for example the MTCI, SAVI, and S2REP indices, the specific wavelengths of interest are also provided in the index formula.

TABLE 1

| Vegetation Index Name | Spectral Bands of Interest | Sentinel-2 Band Assignments | Formula |
|---|---|---|---|
| MERIS terrestrial chlorophyll index (MTCI) | NIR, Red, RE | B4, B5, B6 | $\frac{NIR - RE}{RE - Red} ==> (R_{754} - R_{709})/(R_{709} - R_{691})$ |
| Red Edge Inflection Point (REIP) | $RE_{670}$, $RE_{700}$, $RE_{740}$, $RE_{740}$ | B4, B5, B6, B7 | $700 + 40 * \frac{\frac{R_{670} + R_{780}}{2} - R_{700}}{R_{740} - R_{700}}$ |

TABLE 1-continued

| Vegetation Index Name | Spectral Bands of Interest | Sentinel-2 Band Assignments | Formula |
|---|---|---|---|
| Atmospherically Resistant Vegetation Index (ARVI) | NIR, Red, Blue | B2, B4, B8 | $\dfrac{NIR - 2*\text{Red} - \text{Blue}}{NIR + 2*\text{Red} - \text{Blue}}$ |
| Soil Adjusted Vegetation Index (SAVI) | NIR, Red | B4, B8 | $\left(\dfrac{NIR - \text{Red}}{NIR + \text{Red} + L}\right)(1+L) ==> \left(\dfrac{R_{800} + R_{670}}{R_{800} + R_{670} + L}\right)(1+L)$<br>$L = 0.5$ |
| Modified Soil Adjusted Vegetation Index 2 (MSAVI2) | NIR, Red | B4, B8 | $\dfrac{2*NIR + 1 - \sqrt{(2*NIR+1)^2 - 8*(NIR - \text{Red})}}{2}$ |
| Infrared Percentage Vegetation Index (IPVI) | NIR, Red | B4, B8 | $\dfrac{NIR}{NIR + \text{Red}}$ |
| Normalized Difference Vegetation Index (NDVI) | NIR, Red | B4, B8 | $\dfrac{NIR - \text{Red}}{NIR + \text{Red}}$ |
| Modified Soil Adjusted Vegetation Index (MSAVI) | NIR, Red | B4, B8 | $\dfrac{(NIR - \text{Red} * (1+L))}{NIR + \text{Red} + L}$<br>$L = 1 - 2 * 0.5 * \text{NDVI} * \text{WDVI}$ |
| Transformed Normalized Difference Vegetation Index (TNDVI) | NIR, Red | B4, B8 | $\sqrt{\left(\dfrac{NIR - \text{Red}}{NIR + \text{Red}}\right) + 0.5}$ |
| Green Normalized Difference Vegetation Index (GNDVI) | NIR, Green | B3, B7 | $\dfrac{NIR - \text{Green}}{NIR + \text{Green}}$ |
| Inverted Red Edge Chlorophyll Index (IRECI) | NIR, Red, RE | B4, B5, B6, B7 | $\dfrac{NIR - \text{Red}}{RE_1 / RE_2}$ |
| Global Environmental Monitoring Index (GEMI) | NIR, Red | B4, B5, B8A | $\eta*(1 - 0.25*\eta) - \dfrac{\text{Red} - 0.125}{1 - \text{Red}}$<br>$\eta = \dfrac{2*(NIR^2 - \text{Red}^2) + 1.5*NIR + 0.5*\text{Red}}{NIR - \text{Red} + 0.5}$ |
| Normalized Difference Index 45 (NDI45) | NIR, Red | B4, B8 | $\dfrac{NIR - \text{Red}}{NIR + \text{Red}}$ |
| Perpendicular Vegetation Index (PVI) | NIR, Red | B4, B8 | NIR * sin(α) − Red * (cos α),<br>a is angle between soil line and NIR axis, e.g., 45° |
| Difference Vegetation Index (DVI) | NIR, Red | B4, B8 | NIR − Red |
| Pigment Specific Simple Ratio (PSSRa) | RE, Red | B4, B7 | $\dfrac{RE}{NIR}$ |
| Ratio Vegetation Index (RVI) | NIR, Red | B4, B8 | $\dfrac{NIR}{\text{Red}}$ |
| Weighted Difference Vegetation Index (WDVI) | NIR, Red | B4, B8 | NIR − s * Red, s = 0.5 |

TABLE 1-continued

| Vegetation Index Name | Spectral Bands of Interest | Sentinel-2 Band Assignments | Formula |
|---|---|---|---|
| Transformed Soil Adjusted Vegetation Index (TSAVI) | NIR, Red | B4, B8 | $\frac{A*(NIR - A*\text{Red} - B)}{A*NIR + \text{Red} - A*B + X*(1 + A^2)}.$ $A = 0.5, B = 0.5, X = 0.08$ |
| Sentinel-2 Red Edge Position (S2REP) | Red, RE | B4, B5, B6, B7 | $705 + 35 * \frac{\frac{R_{783} + R_{665}}{2} - R_{705}}{R_{740} - R_{705}}$ |
| Modified Chlorophyll Absorption Ratio Index (MCARI) | Green, Red, RE | B3, B4, B5 | $\frac{RE}{\text{Red}} * (RE - \text{Red} - 0.2 * (RE - \text{Green}))$ |
| Enhanced Vegetation Index (EVI) | Blue, Red, NIR | B9, B4, B8 | $\frac{2.5*(NIR - \text{Red})}{NIR + 6*\text{Red} - 7.5*\text{Blue} + 1}$ |

For each VI, the processing subsystem 16 statistically combines the calculated per pixel VI, for example, via simple averaging (i.e., arithmetic mean). For example, continuing with the above example of the selected subset of pixels including L pixels, the processing subsystem 16 combines the VI values for each of the L pixels by averaging the L VI calculations together to form a combined VI for the particular spectral image.

As a result, for each particular VI type, a combined VI is calculated by the processing subsystem 16, The VI calculation process is performed for each of the selected spectral images to produce a time series of VI values (i.e., multiple temporal instances of a particular VI) for each VI type. Consider the example of calculating MTCI, REIP and S2REP indices. If the selected subset of spectral images includes five spectral images captured over the course of twenty days, three separate five-data point time series of index values can be calculated by the processing subsystem 16, with each data point corresponding to a respective one of the spectral images. Specifically, the processing subsystem 16 can calculate a first five-point time series of MTCI index values, a second five-point time series of REIP index values, and a third five-point time series of S2REP index values.

The processing subsystem 16 then generates a mapping function between the VI time series and the ground truth crop coefficient time series. The mapping function is generated by fitting a curve, for example, via simple linear regression, to data pairs. Each data pair includes one of the VI values from the VI time series and one of the ground truth crop coefficient values from the ground truth crop coefficient time series. The temporal instances of the VI value and the crop coefficient value in each data pair are coincident (or approximately coincident). The term "approximately coincident" within the context of temporal instances, generally refers to two temporal instances which are close to each other in time during the same period of the same or different growing seasons, and in which the atmospheric changes to the environment and the physiological changes to the crop, between the two temporal instances, are negligible. For example, in a first case, two temporal instances may be considered approximately coincident if they correspond to approximately the same time during the same growing season, and in a second case, two temporal instances may be considered approximately coincident if they correspond to approximately the same time during two separate growing seasons. In other words, in the second case, a first temporal instance that corresponds to the first day of a first growing season, and a second temporal instance that corresponds to the first day of a second growing season, may be considered as coincident or approximately coincident, even if the calendars days corresponding to the two temporal instances are different.

The mapping function is subsequently used to estimate the crop coefficient based on VI values derived from additional spectral images subsequently captured by the RSS 12. The mapping function has the general form of $K_{est} = m*VI_{in} + b$, where m and b are the slope and y-intercept, respectively, of the fit line, $VI_{in}$ is the input to the mapping function (i.e., a VI derived from a subsequently captured spectral image), and $K_{est}$ is the output of the mapping function (i.e., crop coefficient estimate).

Tables 2-5 show example mapping functions for some or all of the VI types of Table 1. Tables 2-4, in particular, show, for each of the VI types of Table 1, example mapping functions between VI and ground truth crop coefficient. The example mapping functions are based on simple linear regressions that use data collected during different experiments conducted in the field.

In Table 2, the experiments rely on spectral images captured by the Sentinel-2 satellite constellation, and ground truth evapotranspiration measured by the EMS 14 for particular cotton crops over a period of a growing season. The experiments include five spectral images, resulting in a time series of VI values consisting of five sample data points. Likewise, the experiment includes five temporal instances of ground truth evapotranspiration ($ET_c$) measured by the EMS 14, resulting in a time series of crop coefficient values consisting of five sample data points.

In Table 3, the experiments rely on spectral images captured by the Sentinel-2 satellite constellation, and ground truth evapotranspiration measured by the EMS 14 for particular cotton crops over a period of a different growing season from that of the experiments relied upon for Table 2. The experiments include spectral images, resulting in a time series of VI values consisting of seven sample data points. Likewise, the experiment includes seven temporal instances of ground truth evapotranspiration ($ET_c$) measured by the EMS 14, resulting in a time series of crop coefficient values consisting of seven sample data points.

In Table 4, the experiments relied upon for Tables 2 and 3 are combined to create longer time series of VI values and crop coefficient values (i.e., time series consisting of 5+7=12 data points).

In Table 5, example mapping functions between VI and ground truth crop coefficient are shown for a subset of the VI types of Table 1. The subset of VI types are MTCI and NDVI. Similar to Tables 2-4, the example mapping functions in Table 5 are based on simple linear regressions that use data collected during different experiments conducted in the field. In particular, the experiments rely on spectral images captured by the Sentinel-2 satellite constellation, and ground truth evapotranspiration measured by the EMS 14 for particular tomato crops over a period of a growing season. The experiments include 12 spectral images, resulting in a time series of VI values consisting of 12 sample data points. Likewise, the experiment includes 12 temporal instances of ground truth evapotranspiration ($ET_c$) measured by the EMS 14, resulting in a time series of crop coefficient values consisting of 12 sample data points.

Also shown in Tables 2-5 are fidelity measurements of the mapping functions, in particular, the coefficient of determination (i.e., $R^2$) and the root mean squared error (i.e., RMSE). Note that the slope and y-intercept values in Tables 2-5 are only shown to four decimal places for convenience.

TABLE 2

| Vegetation Index Name | Mapping Function | $R^2$ | RMSE |
|---|---|---|---|
| MTCI | $K_{est} = 0.2033 * VI_{in} + 0.0696$ | 0.9915 | 0.0079 |
| REIP | $K_{est} = 0.1127 * VI_{in} - 80.455$ | 0.9942 | 0.0125 |
| S2REP | $K_{est} = 0.1288 * VI_{in} - 92.37$ | 0.9942 | 0.0134 |
| ARVI | $K_{est} = 1.2752 * VI_{in} - 0.2182$ | 0.9582 | 0.0175 |
| SAVI | $K_{est} = 1.6666 * VI_{in} - 0.2639$ | 0.9576 | 0.0176 |
| MSAVI2 | $K_{est} = 1.1929 * VI_{in} - 0.6057$ | 0.952 | 0.0188 |
| IPVI | $K_{est} = 2.6679 * VI_{in} - 1.6013$ | 0.9493 | 0.0193 |
| MSAVI | $K_{est} = 1.4789 * VI_{in} - 0.12$ | 0.9492 | 0.0193 |
| NDVI | $K_{est} = 1.3334 * VI_{in} - 0.2669$ | 0.9491 | 0.0193 |
| TNDVI | $K_{est} = 3.0269 * VI_{in} - 2.6499$ | 0.949 | 0.0193 |
| GNDVI | $K_{est} = 1.6906 * VI_{in} - 0.413$ | 0.9484 | 0.0194 |
| IRECI | $K_{est} = 0.2492 * VI_{in} + 0.4425$ | 0.9408 | 0.0208 |
| GEMI | $K_{est} = 2.5699 * VI_{in} - 1.6329$ | 0.9372 | 0.0214 |
| EVI | $K_{est} = 1.8851 * VI_{in} - 0.6947$ | 0.9206 | 0.0241 |
| NDI45 | $K_{est} = 1.1401 * VI_{in} + 0.3158$ | 0.91 | 0.0257 |
| PVI | $K_{est} = 3.0585 * VI_{in} - 0.1826$ | 0.896 | 0.0276 |
| DVI | $K_{est} = 2.1624 * VI_{in} - 0.1826$ | 0.8959 | 0.0276 |
| PSSRa | $K_{est} = 0.0227 * VI_{in} + 0.5686$ | 0.8902 | 0.0284 |
| RVI | $K_{est} = 0.0220 * VI_{in} + 0.5724$ | 0.8843 | 0.0291 |
| WDVI | $K_{est} = 2.6251 * VI_{in} - 0.4654$ | 0.8178 | 0.0365 |
| TSAVI | $K_{est} = 0.8454 * VI_{in} + 0.8522$ | 0.7673 | 0.0413 |
| MCARI | $K_{est} = -120.14 * VI_{in} + 1.4561$ | 0.3199 | 0.0706 |

TABLE 3

| Vegetation Index Name | Mapping Function | $R^2$ | RMSE |
|---|---|---|---|
| MTCI | $K_{est} = 0.2385 * VI_{in} - 0.1435$ | 0.9296 | 0.0473 |
| TSAVI | $K_{est} = 0.5614 * VI_{in} + 0.7894$ | 0.8776 | 0.0624 |
| EVI | $K_{est} = 1.4466 * VI_{in} - 0.386$ | 0.8342 | 0.0726 |
| WDVI | $K_{est} = 2.3837 * VI_{in} - 0.4156$ | 0.8066 | 0.0784 |
| GEMI | $K_{est} = 2.364 * VI_{in} - 1.4981$ | 0.8028 | 0.0792 |
| PVI | $K_{est} = 2.9806 * VI_{in} - 0.238$ | 0.7676 | 0.0859 |
| DVI | $K_{est} = 2.1076 * VI_{in} - 0.238$ | 0.7675 | 0.0859 |
| S2REP | $K_{est} = 0.0873 * VI_{in} - 62.381$ | 0.7808 | 0.0864 |
| REIP | $K_{est} = 0.0764 * VI_{in} - 54.308$ | 0.7808 | 0.0884 |
| IRECI | $K_{est} = 0.3025 * VI_{in} + 0.2552$ | 0.7271 | 0.0931 |
| MSAVI | $K_{est} = 1.5766 * VI_{in} - 0.2812$ | 0.7038 | 0.0970 |
| SAVI | $K_{est} = 1.8259 * VI_{in} - 0.4674$ | 0.7016 | 0.0974 |

TABLE 3-continued

| Vegetation Index Name | Mapping Function | $R^2$ | RMSE |
|---|---|---|---|
| ARVI | $K_{est} = 1.4396 * VI_{in} - 0.4468$ | 0.6688 | 0.1026 |
| MSAVI2 | $K_{est} = 1.2824 * VI_{in} - 0.823$ | 0.6601 | 0.1039 |
| TNDVI | $K_{est} = 3.984 * VI_{in} - 3.8804$ | 0.5418 | 0.1206 |
| NDVI | $K_{est} = 1.7342 * VI_{in} - 0.7279$ | 0.5350 | 0.1215 |
| IPVI | $K_{est} = 3.4687 * VI_{in} - 2.4624$ | 0.5349 | 0.1216 |
| GNDVI | $K_{est} = 2.5308 * VI_{in} - 1.1528$ | 0.4528 | 0.1318 |
| PSSRa | $K_{est} = 0.0144 * VI_{in} + 0.4894$ | 0.3918 | 0.1390 |
| RVI | $K_{est} = 0.0137 * VI_{in} + 0.4928$ | 0.3807 | 0.1403 |
| NDI45 | $K_{est} = 0.6759 * VI_{in} + 0.3607$ | 0.1970 | 0.1597 |

TABLE 4

| Vegetation Index Name | Mapping Function | $R^2$ | RMSE |
|---|---|---|---|
| MTCI | $K_{est} = 0.2469 * VI_{in} - 0.1389$ | 0.8892 | 0.0565 |
| TSAVI | $K_{est} = 0.6134 * VI_{in} + 0.8188$ | 0.8608 | 0.0639 |
| EVI | $K_{est} = 1.5686 * VI_{in} - 0.4604$ | 0.8596 | 0.0645 |
| GEMI | $K_{est} = 2.5571 * VI_{in} - 1.6527$ | 0.8282 | 0.0714 |
| WDVI | $K_{est} = 2.5886 * VI_{in} - 0.4835$ | 0.8097 | 0.0752 |
| S2REP | $K_{est} = 0.975 * VI_{in} - 69.781$ | 0.8043 | 0.0790 |
| PVI | $K_{est} = 3.2238 * VI_{in} - 0.2811$ | 0.7759 | 0.0816 |
| DVI | $K_{est} = 2.2795 * VI_{in} - 0.2811$ | 0.7759 | 0.0816 |
| REIP | $K_{est} = 0.0854 * VI_{in} - 60.757$ | 0.8042 | 0.0845 |
| MSAVI | $K_{est} = 1.6769 * VI_{in} - 0.3023$ | 0.7078 | 0.0930 |
| SAVI | $K_{est} = 1.9294 * VI_{in} - 0.4921$ | 0.7052 | 0.0934 |
| IRECI | $K_{est} = 0.3101 * VI_{in} + 0.288$ | 0.7044 | 0.0937 |
| ARVI | $K_{est} = 1.5168 * VI_{in} - 0.4691$ | 0.6912 | 0.0950 |
| MSAVI2 | $K_{est} = 1.3544 * VI_{in} - 0.8623$ | 0.6567 | 0.1005 |
| TNDVI | $K_{est} = 3.8448 * VI_{in} - 3.6663$ | 0.5189 | 0.1183 |
| IPVI | $K_{est} = 3.3559 * VI_{in} - 2.3049$ | 0.5125 | 0.1191 |
| NDVI | $K_{est} = 1.6774 * VI_{in} - 0.6266$ | 0.5124 | 0.1191 |
| GNDVI | $K_{est} = 2.3139 * VI_{in} - 0.9436$ | 0.4630 | 0.1254 |
| PSSRa | $K_{est} = 0.014 * VI_{in} + 0.5672$ | 0.2918 | 0.1407 |
| RVI | $K_{est} = 0.0132 * VI_{in} + 0.5726$ | 0.2786 | 0.1418 |
| NDI45 | $K_{est} = 0.712 * VI_{in} + 0.4121$ | 0.1897 | 0.1510 |

TABLE 5

| Vegetation Index Name | Mapping Function | $R^2$ | RMSE |
|---|---|---|---|
| MTCI | $K_{est} = 0.2791 * VI_{in} + 0.0406$ | 0.8328 | 0.0748 |
| NDVI | $K_{est} = 0.7437 * VI_{in} + 0.3941$ | 0.7730 | 0.0871 |

Figure 6:
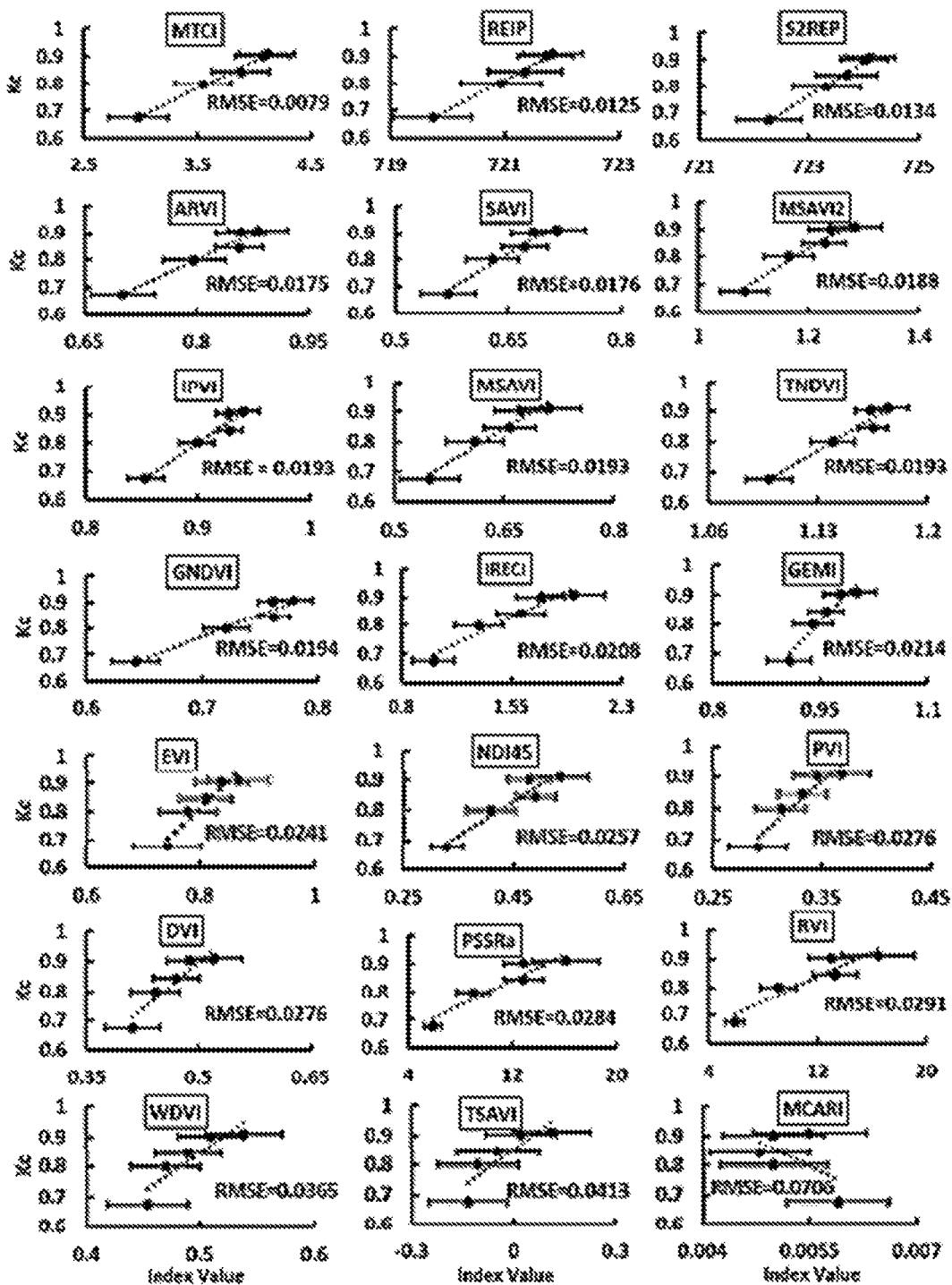
FIG. 6 is a series of mapping functions for several different vegetation indices (VIs) based on data collected by the evapotranspiration subsystem and spectral images captured by the image sensing system of the remote sensing subsystem.
Figure 7:
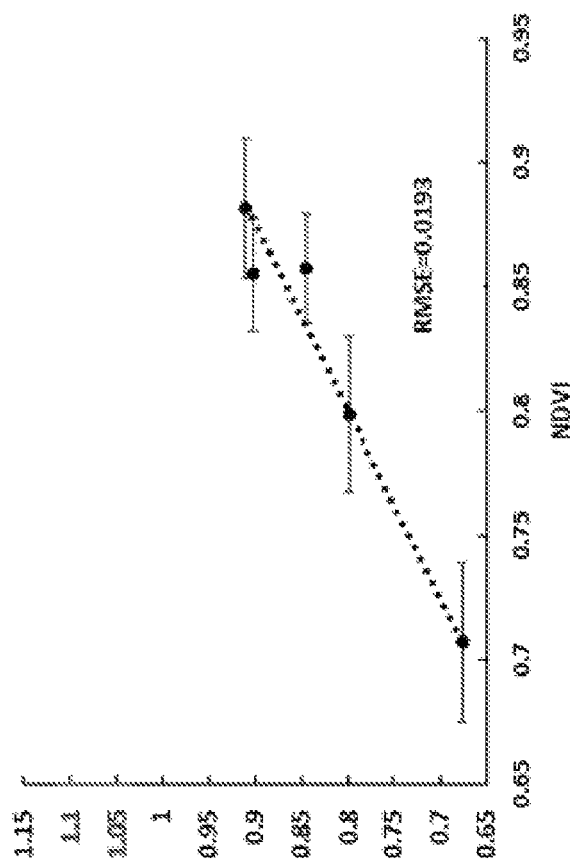
FIG. 7 is a mapping function for Normalized Difference Vegetation Index (NDVI) based on data collected by the evapotranspiration subsystem and spectral images captured by the image sensing system of the remote sensing subsystem.

FIG. 6 shows plots of the mapping functions (i.e., regression models) for all of the various VIs listed in Table 2, except for NDVI. The mapping function for NDVI is shown separately in FIG. 7. The horizontal axes in the plots shown in FIGS. 6 and 7 represent the vegetation index value (i.e., the mapping function input), and the vertical axes represent the crop coefficient (i.e., the mapping function output). The dots (i.e., the data points) represent VI value—measured crop coefficient data pairs, where each VI value is averaged over all pixels, for a respective image, based on the formulae shown in Table 1, and each measured crop coefficient is measured by the EMS 14. The dotted line represents the mapping function (i.e., the best fit line) for the data points. The standard deviation is represented by error bars.

As can clearly be seen from Tables 1 and 2, and FIGS. 6 and 7, the VIs which produce the most accurate estimates of crop coefficient ($K_c$), in terms of lowest RMSE and highest $R^2$ values, are the MTCI, REIP and S2REP indices. In addition, Tables 3 and 4 clearly show that MTCI produces the most accurate estimate of crop coefficient ($K_c$), in terms of lowest RMSE and highest $R^2$ values, and Table 5 clearly shows that MTCI outperforms NDVI as an estimate for crop coefficient ($K_c$). As seen from Table 1, the MTCI, REIP and S2REP indices hinge strongly on the spectral data in the red edge region. The MTCI index in particular relies on reflectance values around wavelengths of 705 nm, which is toward the beginning portion of the red edge region. The REIP index relies on reflectance values around wavelengths of 700 nm, 740 nm and 780 nm, which are toward the beginning, middle and end portions, respectively, of the red edge region. The S2REP index relies on reflectance values at wavelengths similar to those of the REIP index. Specifically, the S2REP index relies on reflectance values around wavelengths of 705 nm, 740 nm and 783 nm, which, like the REIP red edge wavelengths, are toward the beginning, middle and end portions, respectively, of the red edge region.

Due to the high correlation between VIs that rely heavily on reflectance values in the red edge region, for example the MTCI, REIP and S2REP indices, it may be desirable to filter the spectral data received from the RSS 12 to remove spectral data not used to calculate VIs that are highly correlated with crop coefficient. For example, it may be desirable to filter the spectral data to remove reflectance data that is not at or near the wavelengths of 670 nm, 700 nm, 740 nm, 780 nm, and 830 nm, which are the wavelengths of interest for calculating MTCI, REIP and S2REP.

According to certain embodiments, the processing subsystem 16 may be configured to perform such filtering operations. The filtering may be initiated by a user of the processing subsystem 16 by inputting filtering criteria. In certain embodiments, the processing subsystem 16 performs filtering operations by first retrieving a data record of the image data (that includes spectral data across all of the spectral bands contained in the spectral image) from memory. As mentioned above, the data record may be stored in a memory of the ground station 126 or in a memory of the processing subsystem 16. The processing subsystem 16 may then generate a new data record that includes only the vector components, for each pixel, that correspond to spectral bands of interest. For example, the processing subsystem 16 may generate a new data record that only includes vector components, for each pixel, corresponding to spectral bands centered at or near the wavelengths of 670 nm, 700 nm, 740 nm, 780 nm, and 830 nm. The processing subsystem 16 may then use the pixel information in the new data record to calculate a VI (or VIs) of interest. The processing subsystem 16 may repeat the data record retrieval and generation process for each of the captured spectral images, in order to generate time series for VIs of interest.

Alternatively, the processing subsystem 16 may employ a series of bandpass spectral filters centered at or near the wavelengths. For example, a series of five bandpass spectral filters may be used, with one filter centered at or near 670 nm, another filter centered at or near 700 nm, another filter centered at or near 740 nm, another filter centered at or near 780 nm, and another filter centered at or near 830 nm.

The generated VI time series may be stored as a data record in a memory of the processing subsystem 16.

In other embodiments, the processing subsystem 16 may refrain from filtering the spectral data and may perform calculations for generating VI time series for multiple VI types. The VI time series may then be stored as a data record in a memory of the processing subsystem 16. The processing subsystem 16 may then perform filtering by modifying the data record to remove VI time series for VIs that are not highly correlated with crop coefficient, for example, TSAVI and RVI indices.

Figure 8:
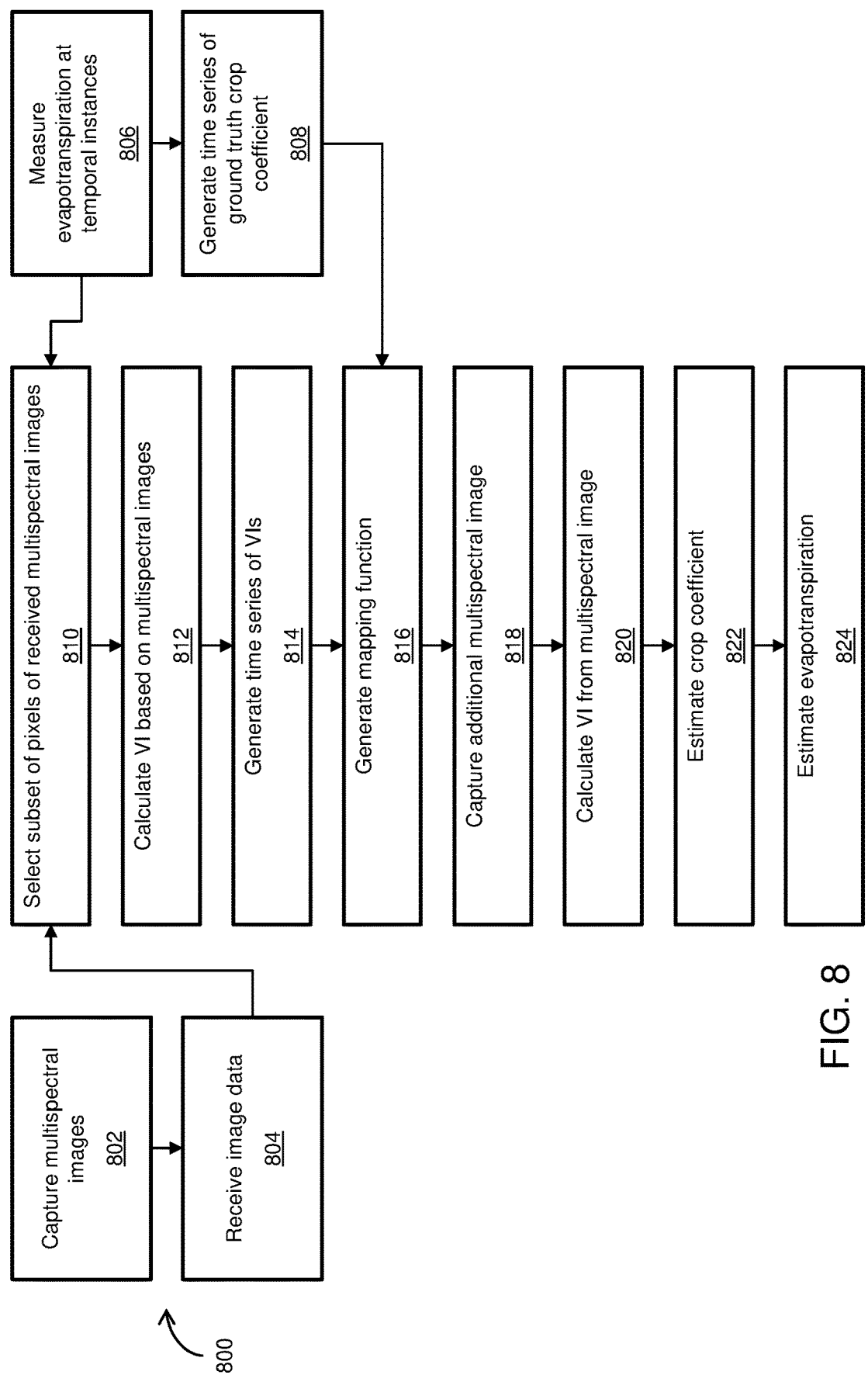
FIG. 8 is a flow diagram illustrating a process to estimate crop coefficient and evapotranspiration of a crop.

Attention is now directed to FIG. 8 which shows a flow diagram detailing a process 800 in accordance with embodiments of the disclosed subject matter. The process 800 includes method steps for estimating the crop coefficient ($K_c$) and evapotranspiration ($ET_c$) of a crop growing in a crop growing area. The sub-processes of the process 800 may be performed by different components of the system 10. For example, some of the sub-processes of the process 800 are computerized processes performed by the processing subsystem 16 and its related components, such as the components of the processing subsystem 16 shown in an exemplary implementation illustrated in FIG. 10. Other sub-processes of the process 800 are performed by the RSS 12, and yet other sub-processes of the process 800 are performed by the EMS 14. It is noted that some of the sub-processes performed by the EMS 14 and the processing subsystem 16 (and its related components), may be performed substantially in parallel.

It is noted that the method steps of the process 800 are described within the context of estimating the crop coefficient ($K_c$) and evapotranspiration ($ET_c$) based on a single VI (e.g., MTCI), however, as will be discussed, the process 800 may be extended to scenarios in which multiple estimates of the crop coefficient ($K_c$) and evapotranspiration ($ET_c$) are performed based on multiple respective VIs.

By way of introduction, it is noted that blocks 802-816 of the process 800 are performed by the system 10 during what is referred to as a "calibration period", during which mapping functions are generated based on captured spectral images and measured evapotranspiration, as discussed above. Blocks 818-824 of the process 800 are performed by the system 10 during what is referred to as "routine operation", during which one or more of the mapping functions generated during the calibration period are used to estimate crop coefficient and evapotranspiration.

The process 800 begins at block 802, where the system 10, and more specifically the image sensor system 122 of the RSS 12, captures spectral images of the crop in the crop growing area. The spectral images are captured at temporal instances when the platform 120 is positioned such that the crop growing area is within the field of view of the image sensor system 122. As discussed above, each of the spectral images includes image data that also includes high-resolution spectral data at spectral bands of interest, in particular a large number of wavelengths in spectral bands between the visible and NIR regions of the electromagnetic spectrum.

The process 800 then moves to block 804, where the processing subsystem 16 obtains spectral image data from the image sensor system 122, As discussed above, the spectral image data is embedded/encoded in downlink communication signals transmitted by the communications module 124. The spectral image data is derived from the spectral images captured by the image sensor system 122. Note that for each captured spectral image, the RSS 12 may provide the processing subsystem 16 with the spectral image data immediately (or shortly thereafter) upon capturing of the spectral image. Alternatively, the RSS 12 may provide the processing subsystem 16 with all of the image data from the captured spectral images in a single shot.

In parallel, or substantially in parallel, to block 802, the process 800 also executes block 806, where the EMS 14 measures ground truth evapotranspiration. As discussed above, the EMS 14 measures ground truth evapotranspiration at multiple temporal instances by gathering data at those multiple temporal instances, which coincide (or approximately coincide) with the temporal instances at which the image sensor system 122 captures the spectral images. The process 800 then moves to block 808, where the EMS 14 generates a time series of ground truth crop coefficients based on the produced ground truth evapotranspiration.

From blocks 804 and 806, the process 800 moves to block 810, where the processing subsystem 16 pre-processes each of the received spectral images in order to select a selected subset of pixels to be used in the VI calculations. As discussed above with reference to FIGS. 5A-5C, the selection of the selected subset of pixels is based on a measurement density threshold that corresponds to the area from which the majority of the flux, measured by the eddy covariance system 140, originates.

The process 800 then moves to block 812, where each spectral image is processed by the processing subsystem 16, via, for example, image processing techniques, to produce a calculated VI value (for a specific VI type) from the selected subset of pixels. As discussed above, the VI values are calculated per pixel, and combined, for example, via simple averaging, to form a combined calculated VI. In a particularly preferred embodiment, the VI calculated in block 812 is a VI whose calculation (i.e., formula) relies solely or mostly on reflectance measurements in the red edge region. In other words, the VI is calculated using the spectral data, derived from the spectral images, in the red edge region.

The process 800 then moves to block 814, where the processing subsystem 16 generates a time series of calculated VI values.

The data points of the time series generated in block 808 and the time series generated in block 814 preferably have temporal correspondence. Specifically, the $n^{th}$ data point in the time series of ground truth crop coefficients (block 808) and the $n^{th}$ data point in the time series of VI values (block 8141) have a temporal correspondence such that they are coincident or approximately coincident. As discussed above, two temporal instances may be considered to be coincident or approximately coincident if they correspond to approximately the same time during the same growing season or if they correspond to the same growing season period in two different growing seasons.

As discussed above, the VI calculated in block 812 is preferably a VI that relies heavily on reflectance values in the red edge region, for example the MTCI, REIP and S2REP indices. As such, the processing subsystem 16 preferably utilizes the particular portions of the image data that include spectral data in a particular spectral band of interest (i.e., a first spectral band) that is limited to the red edge region in order to calculate the VI. In a particularly preferred but non-limiting embodiment, the selected VI relies on reflectance values at or near a red edge inflection point, which can be generally defined as the wavelength approximately at the midpoint of the red edge region (e.g., approximately 715-740 nm). Note that the red edge inflection point can vary moderately for different vegetation species and different crop growing conditions.

From blocks 808 and 814, the process 800 moves to block 816, where the processing subsystem 16 generates a mapping function between the VI time series generated in block 808 and the ground truth crop coefficient time series generated in block 814. As discussed above, the mapping function may be generated by performing simple linear regression for VI and ground truth crop coefficient data pairs. As a sub-process of block 816, the processing subsystem 16 may determine (i.e., calculate) one or more fidelity measurements for the generated mapping function. As discussed above, the one or more fidelity measurements may include, for example, the coefficient of determination (i.e., $R^2$) and the root mean squared error (i.e., RMSE).

The process 800 may then move to block 818, where one or more additional spectral images of the crop may be captured by the image sensor system 122. The spectral images captured by the execution of blocks 802 and 818 constitute two subsets of spectral images, wherein the first subset includes the spectral images captured by the execution of block 802 and the second subset includes the spectral image (or images) captured by the execution of block 818.

Assuming that the one or more additional spectral images are not distorted by atmospheric interference e.g., cloud cover), the process 800 may then move to block 820, where the one or more additional spectral images are processed by the processing subsystem 16 to produce one or more calculated VI values (for the same specific VI type). The process 800 may then move to block 822, where the processing subsystem 16 produces one or more estimated crop coefficients by inputting the one or more VI values (calculated in block 820) to the mapping function generated in block 816. The process 800 may then move to block 824, where the processing subsystem 16 produces one or more estimates of evapotranspiration from the one or more estimated crop coefficients by applying the reference evapotranspiration ($ET_0$) to the one or more estimated crop coefficients as a scaling factor.

In certain embodiments, the process 800 is performed in order to estimate the crop coefficient based on different specific VIs (e.g., one estimate based on MTCI, and another estimate based on S2REP). In such embodiments, multiple instantiations of block 812 are executed in parallel, with each instantiation corresponding to a different specific VI type. For example, one instantiation of block 812 may be executed in order to calculate MTCI, while a second instantiation of block 812 may be executed in order to calculate S2REP. As such, multiple instantiations of block 814 may also be executed in parallel, to generate respective time series for each of the VI types calculated in the multiple instantiations of block 812. Furthermore, multiple instantiations of block 816 may also be executed in parallel, in order to generate respective mapping functions for each of the respective VI time series.

It is noted that in embodiments in which the process 800 is performed in order to estimate the crop coefficient based on different specific VI types, it is particularly preferred that at least one of the VI types is a VI type whose calculation (i.e., formula) relies solely or mostly on reflectance measurements in the red edge region, as discussed above.

Note that in embodiments in which the processing subsystem 16 generates multiple respective mapping functions for each of the respective VI time series (based on multiple instantiations of blocks 812-816), the processing subsystem 16 may also be configured to select one of the generated mapping functions as a selected mapping function, and use the selected mapping function for estimating crop coefficient in block 822. The processing subsystem 16 may select the selected mapping function by selecting the respective mapping function that has the highest fidelity. For example, the processing subsystem 16 may select, during the calibration period, the mapping function that has the lowest RMSE or the highest $R^2$ value. Alternatively, the processing subsystem 16 may generate a combined fidelity measurement by assigning weights to the RMSE and $R^2$ values and combining the weighted values. The processing subsystem 16 may then select the mapping function that has the highest combined fidelity measurement.

It is also noted that block 806 may also include sub-processes for verifying the measurements performed by the eddy covariance system 140. In particular, the EMS 14 may perform energy balance closure analysis by fitting a curve, for example, via simple linear regression, to ($R_n$–G, LE+H) data pairs. As discussed above, $R_n$ is the net radiation measured by the net radiometer 146, and G is the soil heat flux measured by the soil heat flux sensors 150. LE is the latent heat flux and H is the sensible heat flux measured by the eddy covariance system 140. Unit slope of the fit line is an indicator of perfect closure.

Figure 9:
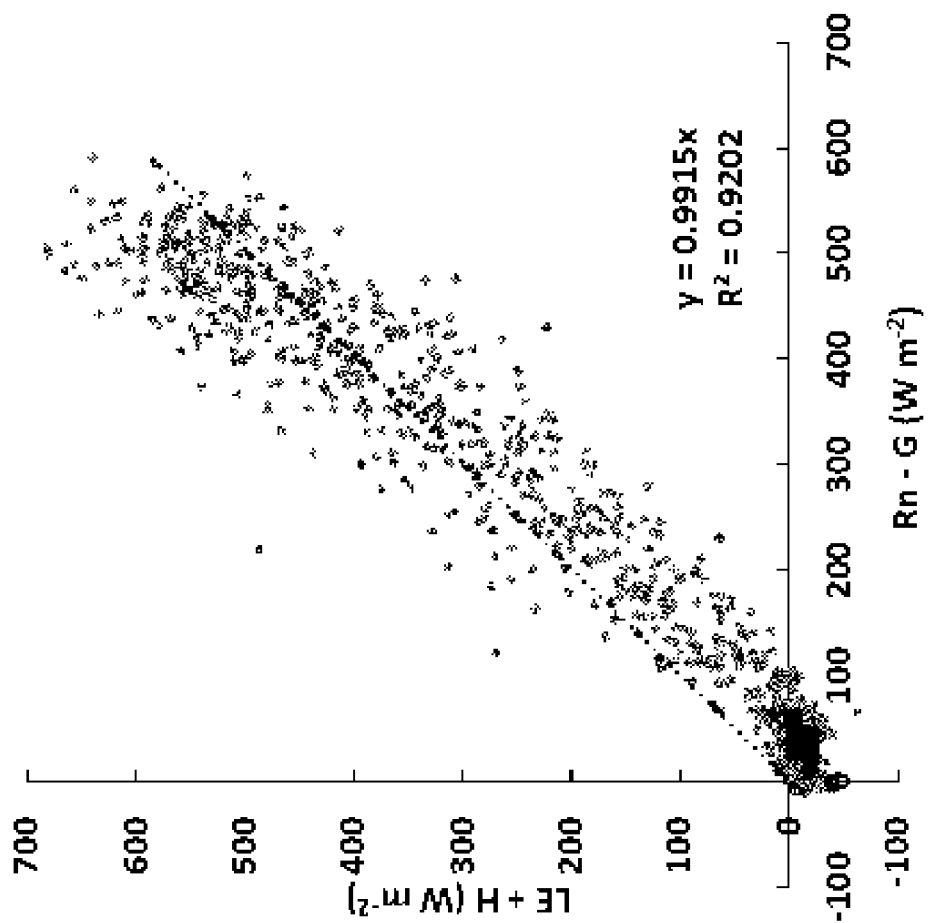
FIG. 9 is a plot of energy balance closure analysis results, based on measurements collected by the evapotranspiration measurement subsystem.

FIG. 9 illustrates a plot from the experiments conducted in the field in which the EMS 14 measures ground truth evapotranspiration for particular cotton crops. As shown, the slope of the fit line is 0.9915, and therefore the eddy covariance system 140 has nearly perfect closure.

Figure 10:
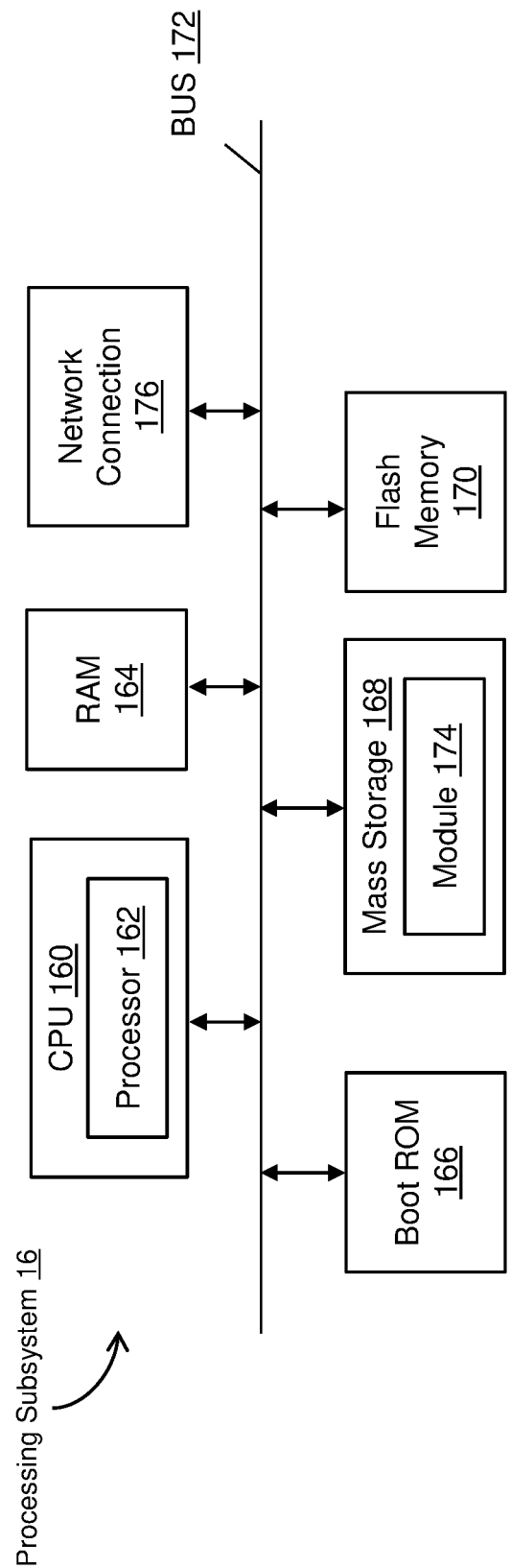
FIG. 10 is a block diagram of an example architecture of the processing subsystem, according to an embodiment of the present disclosure.

Referring now to FIG. 10, a diagram of an example architecture of an exemplary implementation of the processing subsystem 16. The processing subsystem 16 includes a central processing unit (CPU) 160 that is formed of one or more processors 162 for performing various functions, including some or all of the processes and sub-processes shown and described in the flow diagram of FIG. 8. The processors, which can include microprocessors are, for example, conventional processors, such as those used in servers, computers, and other computerized devices. For example, the processors may include x86 Processors from AMD and Xeon® and Pentium® processors from Intel, as well as any combinations thereof.

The processing subsystem 16 further includes four exemplary memory devices: a random-access memory (RAM) 164, a boot read-only memory (ROM) 166, a mass storage device (i.e., a hard disk) 168, and a flash memory 170. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in the CPU 160 including but not limited to reduced instruction set computer (RISC) architecture and/or complex instruction set computer (CISC) architecture. A module (i.e., a processing module) 174 is shown on the mass storage device 168, but as will be obvious to one skilled in the art, could be located on any of the memory devices.

The mass storage device 168 is a non-limiting example of a non-transitory computer-readable storage medium bearing computer-readable code for implementing the stereoscopic presentation creation methodology described herein. The non-transitory computer readable (storage) medium may be a computer readable signal medium or a computer readable storage medium. Other examples of a computer readable storage medium include, but are not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable ROM (EPROM or Flash memory), an optical fiber, a portable compact disc ROM (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The processing subsystem 16 may have an operating system (OS) stored on one or more of the memory devices. The OS may include any of the conventional computer operating systems, such as those available from Microsoft of Redmond Washington, commercially available as Windows® OS, such as, for example, Windows® XP, Windows® 7, Windows® 8 and Windows® 10, MAC OS from Apple of Cupertino, Calif., or Linux.

The ROM 166 may include boot code for the processing system, and the CPU 160 may be configured for executing the boot code to load the OS to the RAM 164, executing the operating system to copy computer-readable code to the RAM 164 and execute the code.

A network connection 176 provides communications to and from the processing subsystem 16 over a network. Typically, a single network connection provides one or more links, including virtual connections, to other devices on local and/or remote networks. Alternatively, the processing subsystem 16 can include more than one network connection (not shown), each network connection providing one or more links to other devices and/or networks.

The processing subsystem 16 may also be provided with a display and/or a user input device such as a keyboard or mouse (not shown) to allow a user of the processing subsystem 16 to interact with the processing subsystem 16. All of the components of the processing system are connected to each other (electronically and/or data), either directly or indirectly, through one or more connections, exemplified in FIG. 10 as a communication bus 172.

Implementation of the system and/or method of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

The block diagrams in the drawings illustrate the architecture, functionality, and operation of possible implementations of systems, devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method, comprising:
   determining at least one vegetation index of a crop based at least in part on image data in a red edge spectral region of the electromagnetic spectrum defined as having wavelengths between 680 nanometers and 780 nanometers and in which reflectance of the crop is monotonically increasing and reaches a reflectance of at least 20% for the wavelengths in the red edge spectral region, wherein the red edge spectral region includes a plurality of spectral sub-bands including at least a first, a second, and a third spectral sub-band, and wherein the first spectral sub-band includes wavelengths between 680 nanometers and 715 nanometers, and wherein the second spectral sub-band includes wavelengths between 720 nanometers and 750 nanometers, and wherein the third spectral sub-band includes wavelengths between 755 nanometers and 780 nanometers, the image data being derived from a plurality of spectral images of the crop captured by at least one image sensor system; and
   estimating an estimated crop coefficient of the crop based on the determined at least one vegetation index.

2. The method of claim 1, further comprising:
   estimating an estimated evapotranspiration of the crop based on the estimated crop coefficient of the crop.

3. The method of claim 1, wherein each spectral image of the plurality of spectral images is captured at a respective temporal instance, and wherein the at least one vegetation index is determined for each of the plurality of spectral images so as to form a plurality of determinations of the at least one vegetation index.

4. The method of claim 3, wherein the estimating the estimated crop coefficient includes applying a mapping function, generated based in part on a first subset of the plurality of determinations of the at least one vegetation index, to at least one determination of the at least one vegetation index in a second subset of the plurality of determinations of the at least one vegetation index.

5. The method of claim 4, wherein the mapping function is generated by:
   measuring evapotranspiration of the crop at a plurality of temporal instances, each temporal instance of measured evapotranspiration being associated with a respective one of the temporal instances at which a first subset of the plurality of spectral images were captured, the first subset of the plurality of spectral images corresponding to the first subset of the plurality of determinations of the at least one vegetation index,
   determining a true crop coefficient of the crop, for each temporal instance of the plurality of temporal instances, based on the measured evapotranspiration, and
   fitting a curve to a plurality of data pairs, wherein each data pair includes a respective one of the determined true crop coefficients and a respective one of the determined at least one vegetation indices.

6. The method of claim 1, wherein the at least one image sensor system is deployed on a satellite in heliosynchronous orbit around the Earth.

7. The method of claim 1, wherein the at least one image sensor system is deployed on an unmanned aerial vehicle.

8. The method of claim 1, wherein the crops grow in a crop growing region, and wherein the at least one image sensor system has a revisit time, for capturing the spectral images of the crop growing region, of less than 10 days.

9. The method of claim 1, wherein the at least one image sensor system includes a plurality of image sensor systems.

10. The method of claim 9, wherein each image sensor system is deployed on a respective satellite, the satellites forming a satellite constellation in heliosynchronous orbit around the Earth.

11. The method of claim 10, wherein the satellite constellation has a revisit time of less than 10 days.

12. The method of claim 1, wherein the spatial resolution of the at least one image sensor system in the red edge spectral region is approximately 20 meters.

13. The method of claim 1, wherein the at least one vegetation index is determined for each spectral image of the plurality of spectral images, and wherein, for each spectral image, the at least one vegetation index is determined by:

evaluating the at least one vegetation index for each pixel in a selected subset of pixels of the spectral image, and combining the at least one vegetation index for each of the pixels in the selected subset of pixels to form a combined vegetation index for the spectral image.

14. The method of claim 1, wherein the at least one vegetation index includes a plurality of vegetation indices.

15. The method of claim 1, wherein the spectral images include image data in a plurality of spectral bands including at least one spectral band having wavelengths outside of the red edge spectral region, and wherein the at least one vegetation index is further determined based on the image data in the at least one spectral band having wavelengths outside of the red edge spectral region.

16. The method of claim 1, wherein the at least one vegetation index excludes Normalized Difference Vegetative Index (NDVI) and Enhanced Vegetation Index (EVI).

17. The method of claim 1, wherein the at least one vegetation index includes at least one of: i) Medium Resolution Imaging Spectrometer—MERIS—terrestrial chlorophyll index (MTCI), ii) Red Edge Inflection Point (REIP), or iii) Sentinel-2 Red Edge Position (S2REP).

18. A system, comprising:
a processing subsystem configured to:
determining at least one vegetation index of a crop based at least in part on image data in a red edge spectral region of the electromagnetic spectrum defined as having wavelengths between 680 nanometers and 780 nanometers and in which reflectance of the crop is monotonically increasing and reaches a reflectance of at least 20% for the wavelengths in the red edge spectral region, wherein the red edge spectral region includes a plurality of spectral sub-bands including at least a first, a second, and a third spectral sub-band, and wherein the first spectral sub-band includes wavelengths between 680 nanometers and 715 nanometers, and wherein the second spectral sub-band includes wavelengths between 720 nanometers and 750 nanometers, and wherein the third spectral sub-band includes wavelengths between 755 nanometers and 780 nanometers, the image data being derived from a plurality of spectral images of the crop captured by at least one image sensor system, and estimating an estimated crop coefficient of the crop based on the determined at least one vegetation index.

19. A method, comprising:
determining at least one vegetation index of a crop based on image data in at least a first spectral band in which reflectance of the crop is monotonically increasing and reaches a reflectance of at least 20% for at least one wavelength in the first spectral band, the image data being derived from a plurality of spectral images of the crop captured by at least one image sensor system, wherein each spectral image of the plurality of spectral images is captured at a respective temporal instance, and wherein the at least one vegetation index is determined for each of the plurality of spectral images so as to form a plurality of determinations of the at least one vegetation index; and estimating an estimated crop coefficient of the crop based on the determined at least one vegetation index, wherein the estimating the estimated crop coefficient includes applying a mapping function, generated based in part on a first subset of the plurality of determinations of the at least one vegetation index, to at least one determination of the at least one vegetation index in a second subset of the plurality of determinations of the at least one vegetation index, and wherein the mapping function is generated by:
measuring evapotranspiration of the crop at a plurality of temporal instances, each temporal instance of measured evapotranspiration being associated with a respective one of the temporal instances at which a first subset of the plurality of spectral images were captured, the first subset of the plurality of spectral images corresponding to the first subset of the plurality of determinations of the at least one vegetation index, determining a true crop coefficient of the crop, for each temporal instance of the plurality of temporal instances, based on the measured evapotranspiration, and fitting a curve to a plurality of data pairs, wherein each data pair includes a respective one of the determined true crop coefficients and a respective one of the determined at least one vegetation indices.

* * * * *